(12) United States Patent
Bryant et al.

(10) Patent No.: US 8,542,918 B2
(45) Date of Patent: Sep. 24, 2013

(54) IMAGE COLOR ENHANCEMENT

(75) Inventors: Andrew Bryant, Los Gatos, CA (US); Adriana Dumitras, Santa Clara, CA (US)

(73) Assignee: Apple Inc., Cupertino, CA (US)

(*) Notice: Subject to any disclaimer, the term of this patent is extended or adjusted under 35 U.S.C. 154(b) by 541 days.

(21) Appl. No.: 12/892,918

(22) Filed: Sep. 28, 2010

(65) Prior Publication Data

US 2012/0076404 A1 Mar. 29, 2012

(51) Int. Cl.
 *G06K 9/00* (2006.01)
(52) U.S. Cl.
 USPC ........... 382/167; 382/164; 382/274; 382/275; 358/3.26; 358/3.27; 358/463
(58) Field of Classification Search
 USPC ................ 382/164, 167, 274, 275; 358/3.26, 358/3.27, 463
 See application file for complete search history.

(56) References Cited

U.S. PATENT DOCUMENTS

| | | | |
|---|---|---|---|
| 5,668,646 A * | 9/1997 | Katayama et al. | 358/530 |
| 5,909,505 A * | 6/1999 | Katayama et al. | 382/164 |
| 7,468,821 B2 * | 12/2008 | Hashiguchi et al. | 358/520 |
| 7,565,007 B2 * | 7/2009 | Ishiga | 382/162 |
| 7,738,143 B2 * | 6/2010 | Ishimoto et al. | 358/3.28 |

OTHER PUBLICATIONS

Author Unknown, "Sigmoidal Contrast for Gimp", Sep. 5, 2010. http://www.mm-log.com/blog/2010-05-09/sigmoidal-contrast-gimp.
Author Unknown, "Sigmoidal Non-Linearity Contrast", date unknown but on or before Feb. 9, 2007, 2 pages. http://www.imagemagick.org/Usage/color_mods/#sigmoidal.
Farid, Hany, "Fundamentals of Image Processing", date unknown but on or before Jan. 1, 2008, pp. 1-72. http://www.cs.dartmouth.edu/farid/tutorials/fip.pdf.
Mchugh, Sean, "Tutorials: Photoshop Curves", date unknown but on or before Nov. 25, 2005, pp. 1-7. http://www.cambridgeincolour.com/tutorials/photoshop-curves.htm.

* cited by examiner

*Primary Examiner* — Yosef Kassa
(74) *Attorney, Agent, or Firm* — Robert C. Kowert; Meyertons, Hood, Kivlin, Kowert & Goetzel, P.C.

(57) ABSTRACT

Some embodiments of the invention provide a non-linear image-enhancement method to enhance an image that includes a number of picture elements. The non-linear enhancement method adjusts the brightness value of each pixel in the image and adjusts at least one chromatic value of each pixel in the image based on the adjustment to the brightness value of that pixel.

21 Claims, 9 Drawing Sheets

IMAGE COLOR ENHANCEMENT

BACKGROUND

In recent years, there has been a great increase in the number of digital images (e.g., video and still images from digital cameras, scanned images, etc.). These images are defined in terms of picture elements known as "pixels". Each pixel in a digital image is defined by one or more chromatic color component values (sometimes called "chromatic values") and at times by one achromatic color component value (e.g., a brightness value such as luminance).

The simplest images are black and white images. The pixels of black and white images can be defined with respect to a single achromatic component value that defines an achromatic intensity of the pixel, but does not define any chromatic value for the pixel. Greyscale images are images with pixels that have only achromatic intensity values and no chromatic color values.

The pixels of color images can be defined with respect to various multi-dimensional color coordinate systems. Some examples of such color coordinate systems are tri-chromatic systems (such as RGB), brightness/bi-chromatic systems (such as YCbCr, YUV, etc.), and brightness, saturation, and hue systems (such as HSV).

Tri-chromatic color coordinate systems define an image with respect to three chromatic values. For example, an RGB color coordinate system is defined with respect to red, blue, and green chromatic values. Other tri-chromatic color coordinate systems define a pixel with respect to other chromatic values. Tri-chromatic color coordinate systems do not have an explicit achromatic brightness (sometimes called simply "brightness") value for the pixel. Instead the overall brightness information about the pixel is distributed among the three chromatic values of the tri-chromatic color coordinate system.

Brightness/bi-chromatic systems (such as YCbCr) define an image with respect to a luminance component, which represents an achromatic intensity of the pixel, and two chromatic components. For example, in a YCbCr color coordinate system, the luminance value (Y) is an explicit, achromatic brightness component value of the pixel and the chromatic components are blue-chroma and red-chroma. The blue-chroma value defines the chromaticity of a pixel on a scale ranging from blue to yellow, while the red-chroma value defines the chromaticity of the pixel on a scale from red to green. Other color coordinate systems with one achromatic component and two chromatic components use different chroma scales (e.g., the YIQ color coordinate system uses chroma values that define the pixel on scales from purple to green and from orange to blue). The HSV and HSL color coordinate systems define a pixel in terms of an achromatic color coordinate V or L, a saturation S (chromatic-intensity), and a hue H (chromatic-hue).

To improve perceived image quality, numerous techniques have been proposed to date for improving the contrast (i.e., the amount of difference) between the brightness values of the pixels of the image. For example, in some images, the brightness values are all clustered toward the middle of the range of available brightness values. There are many ways of adjusting the contrast of images by adjusting the brightness of the individual pixel by different amounts. Some existing techniques for adjusting the contrast perform a linear adjustment operation on the brightness component. In other words, a typical contrast adjusting technique adjusts the brightness (e.g., luma or luminance) values linearly.

Other existing methods, such as gamma correction, apply a non-linear adjustment to the achromatic brightness component of the image, but do not apply any adjustment to the chromatic components. For example, a gamma correction on an image in a YCbCr color coordinate system changes the luminance component Y to a luma component Y'. Such a gamma correction operation is often not applied to the chromatic color component values.

BRIEF SUMMARY

Some embodiments of the invention provide a non-linear image-enhancement method to enhance the color contrast of an image that includes a number of picture elements, called pixels. In some embodiments, each pixel is defined in terms of three or more color component values, with one color value being an achromatic component value that explicitly represents the brightness of the pixel, and two or more color values being chromatic color component values that specify chromatic values (i.e., non-brightness component chromatic values) of pixel. For instance, in some embodiments, each pixel is defined in terms of YCbCr values, with Y being an achromatic luminance value, Cb being a chromatic blue value Cb, and a Cr being a chromatic red value Cr. Other embodiments use other color coordinate systems with achromatic and chromatic components, such as YUV, YIQ, etc.

The method of some embodiments uses a non-linear operation to enhance the brightness and chromatic component values of the pixels of the image. This operation applies a bounded continuous, monotonically increasing, non-linear function (such as a sigmoidal function, gamma functions a user defined continuous, monotonically increasing, non-linear tone response curve, etc.) to the brightness values in some embodiments. Alternatively, the operation of other embodiments applies any bounded non-linear function (e.g., any user defined tone response curve, etc.) to the brightness values in some embodiments. The method of some embodiments also adjusts each pixel's chromatic values based on a relative change (e.g., fractional change) of the pixel's brightness value.

Some embodiments provide the above-described method in an application (e.g., in an operating system of a device or computer, in an image or video editing application, etc.) that allows a user to adjust the colors of one or more digital still images or video images (e.g., digital frames). In some of these embodiments, the application provides a user adjustable contrast control (e.g., a slider, knob, input field, etc.) that allows a user to modify the degree to which the achromatic brightness component values within an image should be differentiated.

A user's adjustment of the contrast control causes the application in some of these embodiments to modify the continuous, monotonically increasing, non-linear function that is applied to the achromatic brightness component values of the image. For instance, in some embodiments, the non-linear function is a bounded variable width sigmoidal function. In such embodiments, changes to the value of the contrast control change the width of the sigmoidal function, which changes the rate by which the sigmoidal function changes with respect to input brightness values. The modified function is then applied to each pixel's brightness color component value (e.g., to the pixel's luminance or luma value). The application of this function results in the pixel's brightness value Y changing by a delta brightness value $\Delta Y$.

After using the modified function to adjust each pixel's brightness color component value, the application in some embodiments applies to each pixel's chromatic values an adjustment that is based on the relative change (e.g., fractional change) of the pixel's achromatic brightness component value. For instance, in the embodiments that use the YCbCr color coordinate system to specify each pixel's color, the application adjusts the chromatic color component values Cb and Cr by ΔCb and ΔCr values. The application derives these chromatic delta values (i.e., ΔCb and ΔCr values) from the difference in the pixel's achromatic brightness component value that resulted from the application of the non-linear function to the pixel's brightness value (i.e., from ΔY value). Alternatively, in the embodiments that operate on images in a brightness, saturation, and hue color coordinate system (e.g., HSV or HSL), the application applies to each pixel's saturation value (but not the pixel's hue value) an adjustment that is based on the relative change (e.g., fractional change) of the pixel's achromatic brightness component value.

The application in some embodiments processes images or video clips that are defined in a color domain that does not have an explicit achromatic brightness component value (e.g., images defined in a tri-chromatic color coordinate system such as RGB). Accordingly, before performing its color enhancement on an image that is defined in a color domain without an explicit brightness value, the application in some such embodiments performs a color-coordinate transform operation to convert the color format of the image from its current color coordinate system to a color coordinate system that has an explicit achromatic brightness component value. For example, the application in some embodiments receives images in a RGB color coordinate system and converts the images to a color coordinate system with explicit brightness values (e.g., to a YCbCr color coordinate system). The application in some embodiments converts the images back to original color coordinate system after performing its image enhancement in the transformed color domain with the explicit brightness value.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
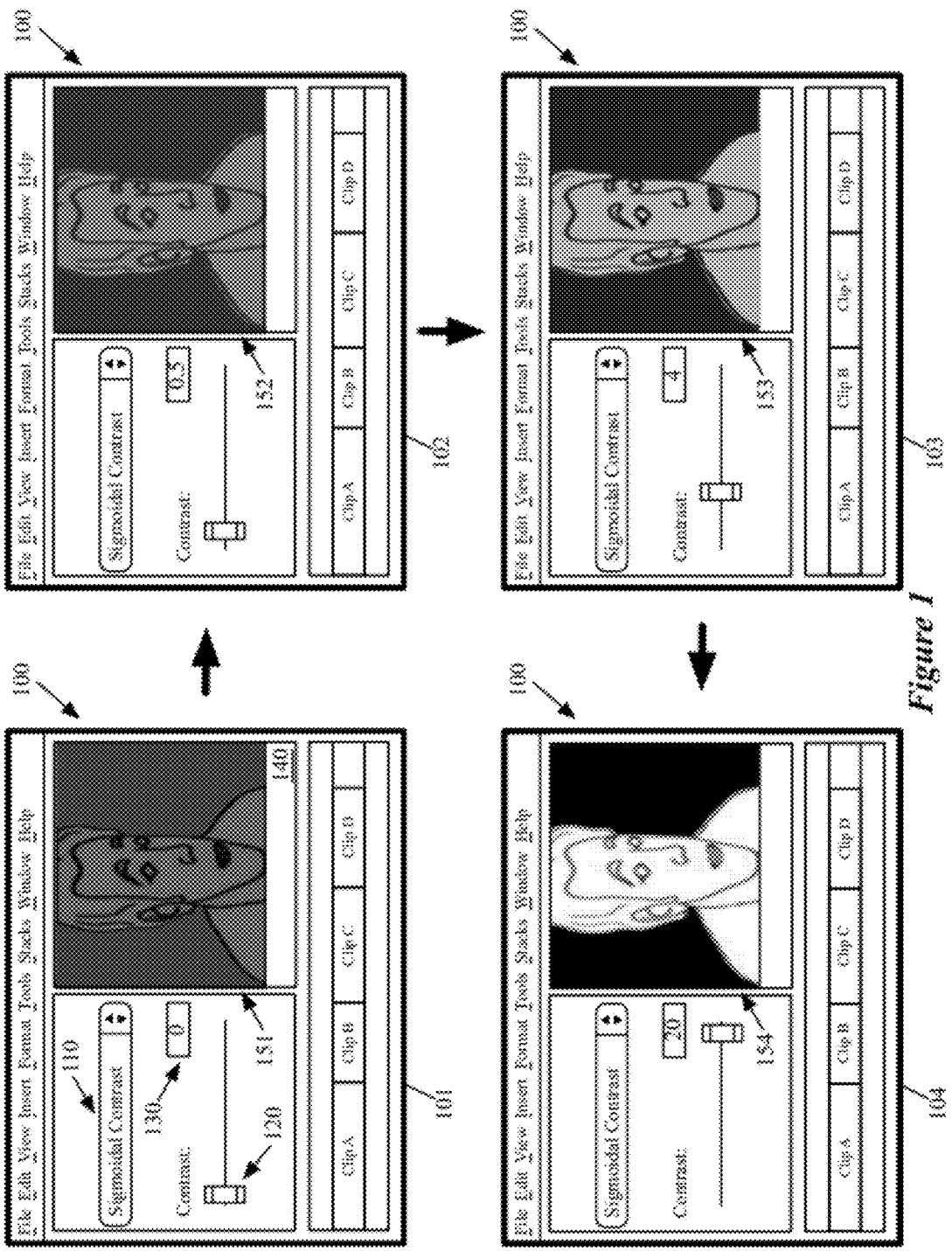
FIG. 1 illustrates a GUI 100 for adjusting the contrast of an image.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a non-linear image-enhancement method to enhance the color contrast (e.g., the contrast of the achromatic and chromatic color component values) of an image that includes a number of picture elements, called pixels. In some embodiments, each pixel is defined in terms of three or more color component values, with one color value being an achromatic component value that explicitly represents the brightness of the pixel, and two or more color values being chromatic color component values that specify chromatic values (i.e., non-brightness component chromatic values) of pixel. The set of color component values for all pixels in an image (e.g., the brightness values of all pixels) is sometimes referred to by the name of that coordinate and the word component. For instance, in some embodiments, each pixel is defined in terms of YCbCr values, with Y being an achromatic luminance value, Cb being a chromatic blue value Cb, and a Cr being a chromatic red value Cr. In such embodiments, the set of Y values collectively define the Y component of the image, the set of Cb values collectively define the Cb component of the image. Other embodiments use other color coordinate systems with achromatic and chromatic components, such as YUV, YIQ, etc.

Color contrast is a measure of how different the color component values of the pixels in the image are from each other. For instance, an increase or a decrease in the contrast for a certain range of brightness values respectively increases or decreases the differences between the values. Such an increase may be applied to three pixels with initial brightness values of 0.4, 0.5, and 0.6. Increasing the contrast of these pixels might modify their brightness values to be 0.3, 0.5, and 0.7, respectively. Alternatively, decreasing the contrast of three pixels with original brightness values 0.05, 0.1, and 0.15 might modify their brightness values to be 0.022, 0.05, and 0.084, respectively. Brightness contrast is different than absolute brightness level of the pixels. Similarly, the contrast between chromatic component values is different than the saturation of the chromatic color values.

The method of some embodiments uses a non-linear operation to enhance the brightness and chromatic component values of the pixels of the image. This operation applies a bounded continuous, monotonically increasing, non-linear function (such as a sigmoidal function, a gamma function, a user defined continuous, monotonically increasing, non-linear tone response curve, etc.) to the achromatic brightness values in some embodiments. Alternatively, the operation of other embodiments applies any bounded non-linear function (e.g., any user defined tone response curve, etc.) to the brightness values. The method of some embodiments also adjusts each pixel's chromatic values based on the relative change (e.g., fractional change) that it applied to the pixel's brightness value.

The non-linear nature of the function that is applied to the achromatic brightness values of the pixels allows the method to modify the brightness contrast differently in different brightness ranges. Specifically, because of this function, the method of some embodiments increases the contrast between the brightness values of some pixels while decreasing the contrast between the brightness values of other pixels. For instance, when three initial pixel brightness values are 0.1, 0.2, and 0.6, the non-linear function might adjust these values to be 0.05, 0.12, and 0.65, respectively. In this example, the method has decreased the brightness contrast between the first two pixels (from 0.10 to 0.07), increased the brightness contrast between the last two pixels (from 0.40 to 0.53) and increased the brightness contrast between the first and last pixel (from 0.5 to 0.60).

In some embodiments, the above-described method is implemented in an application (e.g., in an operating system of a device or computer, in an image or video editing application, etc.) that allows a user to adjust the colors of one or more digital still images or video images (e.g., digital frames). In some of these embodiments, the application provides a user adjustable contrast control (e.g., a slider, knob, input field, etc.) that allows a user to modify the contrast between achromatic color component values within an image. Based on a relative change (e.g., fractional change) of the achromatic color value of each pixel in the image, the application also modifies the pixel's chromatic color component values.

FIG. 1 illustrates a graphical user interface (GUI) 100 of one such application, which, in this example, is a video editing application. This figure illustrates the GUI 100 in four stages 101, 102, 103, and 104 that correspond to four different color contrast operations. Three of these operations (1) modify the contrast between achromatic color component values within an image by using a sigmoidal function to adjust each pixel's brightness value, and (2) modify each pixel's chromatic color component values based on the relative change (e.g., fractional change) of the achromatic color component value of the pixel (e.g., the ratio of the adjusted achromatic color component value of the pixel to the original achromatic color component value of the pixel).

The GUI 100 provides a display and a set of controls that allows a user to control the contrast of an image or video frame that is being composited. Specifically, as shown in FIG. 1, GUI 100 contains a contrast operator selector 110, a contrast control slider 120, a contrast indicator 130, and a display area 140.

The display area 140 in stages 101-104 shows four versions 151-154 of the same image that results from the four different color contrast operations. The contrast operator selector 110 of some embodiments allows a user to select one contrast adjustment operator from a group of contrast adjustment operators that are provided by the application. In some embodiments, this group of operators includes two or more contrast operators. These operators include at least one non-linear operator, such as a sigmoidal function and/or other non-linear functions (e.g., a gamma function). They also may include one or more linear contrast adjustment operators. The contrast operator selector 110 allows a user to select (e.g., through a drop-down menu operation) one contrast operator from the group of operators provided by the selector 110. In the example illustrated in FIG. 1, the contrast operator that is selected through the selector is bounded, variable width sigmoidal function. One of ordinary skill in the art will realize that some embodiments do not provide the user with a choice of contrast operators, but rather simply select a non-linear contrast operator for the user.

The contrast control slider 120 allows a user to adjust the contrast of the selected image (e.g., image 151) by selecting the contrast control slider 120 and moving it to the left or right (e.g., by clicking and dragging it with a cursor control device). The contrast indicator 130 illustrates the present value of the contrast as set by the user. In the illustrated example, a contrast adjustment value of "0" represents an original image and a contrast adjustment value greater than "0" represents an image with enhanced contrast. Some embodiments allow the user to populate the field provided by the contrast indicator 130 to provide a contrast adjustment value. Other embodiments do not allow this field to be directly populated by the user. Still other embodiments do not provide the contrast indicator 130.

The display area 140 shows the state of an image under a set of parameters set by controls (e.g., the contrast control slider 120). Image 151 represents an original image and images 152-154 illustrate the effects on original image 151 of successively higher adjustments to the contrast.

The four stages 101-104 conceptually illustrate the four different results of performing a sigmoidal color contrast operation on the image 151 for four different color contrast adjustment values that are provided through the contrast control slider 120. The contrast adjustment value in each stage 101-104 is shown by the contrast control slider 120 and the contrast indicator 130. The effects of different contrast adjustment values on image 151 is shown by differences in the appearance of images 151-154 in stages 101-104. The individual stages 101-104 are described below.

In stage 101, an original image 151 is shown in display area 140. Original image 151 is a picture of a man shown in medium grey against a darker grey background. In stage 101, the contrast of original image 151 has not been adjusted. In this stage, the contrast control slider is at the far left end of the scale and the contrast indicator 130 is displaying the number "0", indicating a contrast adjustment value of "0". As mentioned above, some embodiments display the original image when the contrast adjustment value is "0".

In stage 102, the application has slightly enhanced the contrast of the original image 151. In this stage, the contrast control slider 120 is near the left end of the scale and the contrast indicator 130 is displaying the number "0.5". Accordingly, image 152 is a contrast enhanced version of the original image 151. Because the contrast adjustment value is slightly greater in stage 102 than in stage 101, the lighter areas in the image 152 (i.e., the man and his clothing) are slightly lighter than in the original image 151. Similarly, the darker areas in the image 152 (i.e., the background) are slightly darker than in the original image 151.

In the second stage 102, the user's adjustment of the contrast control 120 causes the application to modify a width parameter associated with the bounded variable width sigmoidal function. Changing this width parameter changes the rate by which the sigmoidal function changes with respect to input brightness values. The modified function is then applied to each pixel's brightness color component value (e.g., to the pixel's luminance or luma value). Assuming that the image is defined in terms of luminance or luma brightness values, the application of this function results in the pixel's brightness value Y changing by a delta brightness value $\Delta Y$. Based on the adjustment to each pixel's brightness color component value, the application applies to the pixel's chromatic values an adjustment that is based the relative change (e.g., fractional change) of the pixel's achromatic brightness component value. For instance, in the embodiments that use the YCbCr color coordinate system to specify each pixel's color, the application adjusts the chromatic color component values Cb and Cr by ΔCb and ΔCr values that are determined by a function that depends on the original and adjusted Y values. The application derives these chromatic delta values (i.e., ΔCb and ΔCr values) from the difference in the pixel's achromatic brightness component value that resulted from the application of the non-linear function to the pixel's brightness value (i.e., from ΔY value). Alternatively, in the embodiments that operate on images in a brightness, saturation, and hue color coordinate system (e.g., HSV or HSL), the application applies to each pixel's saturation value (but not the pixel's hue value) an adjustment that is based on the relative adjustment (e.g., fractional change) of the pixel's achromatic brightness component value.

In stage 103, the application has further enhanced the contrast of the original image 151. In this stage, the contrast control slider is closer to the middle of the scale and the contrast indicator 130 is displaying the number "4". Accordingly, image 153 is a version of the original image 151 with mid-level increase in contrast. Because the contrast is greater than in stage 102, the lighter areas in the image 153 are even lighter than in the image 152. Similarly, the darker areas in the image 153 are even darker than in the image 152.

As in the second stage 102, the change in the contrast adjustment value in the third stage 103 changes the sigmoidal function's width parameter, which changes the rate by which the sigmoidal function changes with respect to input brightness values. The application then applies this modified function to each pixel's brightness color component value to adjust this value, and then adjusts each pixel's chromatic color component value(s) based on the relative adjustment (e.g., fractional change) of its achromatic color value adjustment.

In stage 104, the application has greatly enhanced the contrast of original image 151. In this stage, the contrast control slider is near the right end of the scale and the contrast indicator 130 is displaying the number "20". Accordingly, image 154 is a version of the original image 151 with a large increase in contrast. Because the change in contrast is much greater than in stages 102-103, the lighter areas in the image 154 are white and the darker areas are black, rather than as shades of grey.

As in the second and third stages 102 and 103, the change in the contrast adjustment value in the fourth stage 104 changes the sigmoidal function's width parameter, which changes the rate by which the sigmoidal function changes with respect to input brightness values. The application then applies this modified function to each pixel's brightness color component value to adjust this value, and then adjusts each pixel's chromatic color component value(s) based on the relative adjustment (e.g., fractional change) of its achromatic color value adjustment.

One of ordinary skill in the art will understand that the GUI 100 is a simplified version of GUIs of some embodiments. The GUIs of such embodiments have a wider range of controls for adjusting various aspects of images. In FIG. 1, for reasons of space and clarity, other controls that affect the image in some embodiments are omitted. An example of such a GUI is provided in FIG. 8, described in Section VI, below.

Although the four stages presented above are in order from least to most contrast enhancement, one of ordinary skill in the art will understand that in some embodiments the contrast enhancement can be set to a higher or lower value at any stage.

In such embodiments, the stages 101-104 with enhanced contrast could be in any order. For example, stage 104 could represent an earlier stage in which the user moved the contrast control slider 120 too far; and stage 103 could represent a later stage in which the user moved the slider back. While the above illustrated stages show contrast adjustments to a single still image or single video frame, the video editing application in some embodiments can apply the contrast enhancement that is examined with respect to a single image or video frame to an entire video clip, to multiple clips, or to one or more selected portions of one or more video clips.

The application in FIG. 1 in some embodiments processes images or video clips that are defined in a color domain that does not have an explicit achromatic brightness component value (e.g., images defined in a tri-chromatic color coordinate system such as RGB). Accordingly, before performing its color enhancement on an image that is defined in a color domain without an explicit brightness value, the application in some such embodiments performs a color-coordinate transform operation to convert the color format of the image from its current color coordinate system to a color coordinate system that has an explicit achromatic brightness component value. For example, the application in some embodiments receives images in a RGB color coordinate system and converts the images to a color coordinate system with explicit brightness values (e.g., to a YCbCr color coordinate system). The application in some embodiments converts the images back to original color coordinate system after performing its image enhancement in the transformed color domain with the explicit brightness value.

Several operations of the image editing application in some embodiments are further described below. Specifically, Section I describes a process that the application uses in some embodiments to adjust the brightness contrast through a user-adjustable, bounded, variable-width sigmoidal contrast operator. Section II then describes a process that the application uses in some embodiments to adjust the chromatic color component values of each pixel based on the brightness adjustment for that pixel. Next, Section III describes several graphs that illustrate adjustments to the sigmoidal operator based on user input, and that further illustrate adjustments to chromatic multipliers based on the brightness adjustments.

Section IV then describes the color conversion and adjustment operations that the application performs in some embodiments to adjust the contrast of images that are originally defined in chromatic-only color coordinate system. Section V next describes the software architecture of the application in some embodiments. Section VI then describes a more detailed GUI of the application in some embodiments. Lastly, Section VII describes a computing device that executes the application in some embodiments.

Many of the embodiments described below are described by reference to images that are initially defined in the RGB color coordinate system or are contrast adjusted in the YCbCr color coordinate system. Also, in the discussion below, the Y component of the YCbCr coordinate system is referred to as the luminance component. However, one of ordinary skill in the art will realize that in place of luminance Y, some embodiments perform the color contrast brightness operation on the luma Y' component, e.g., on a Y'CbCr coordinate system. Also, one of ordinary skill in the art will realize that other embodiments perform contrast adjustment operations on pixel values defined in terms of other color coordinate systems with achromatic brightness color component values.

I. Brightness Adjustment

Figure 2:
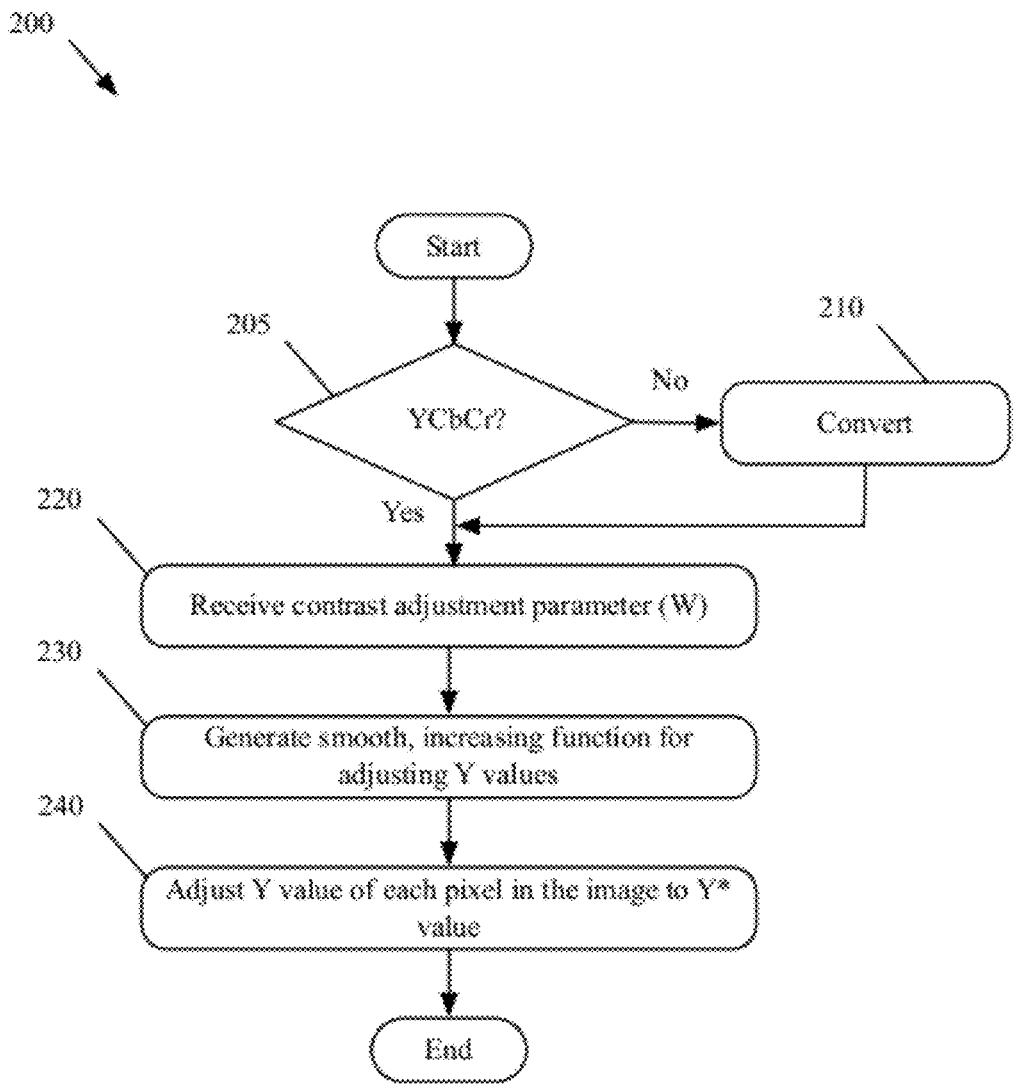
FIG. 2 conceptually illustrates a process 200 of some embodiments for adjusting the brightness (e.g., luminance or luma) values of individual pixels to enhance the contrast of an image.

The application in some embodiments enhances the contrast of both the brightness and the chromatic values of an image. This section describes a process that the application uses in some embodiments to enhance the contrast of the brightness values (the "brightness contrast"). FIG. 2 conceptually illustrates a process 200 of some embodiments for adjusting the brightness (e.g., luminance or luma) values of individual pixels to enhance the brightness contrast of an image.

The process 200 of some embodiments adjusts images in a color coordinate system that has a brightness component and two chromatic components (e.g. a YCbCr or Y'CbCr color coordinate system). However, in some cases images to be adjusted are not originally formatted in such a color coordinate system. Therefore, the process 200 determines (at 205) whether an image uses a color coordinate system that has a brightness component and two chromatic components (e.g. a YCbCr or Y'CbCr color coordinate system). If the image does not use a color coordinate system that has a brightness component and two chromatic components, then the process 200 uses a color coordinate system transform operation to convert (at 210) the image from its original color coordinate system to a color coordinate system with a brightness component (e.g. a YCbCr or Y'CbCr color coordinate system).

For example, some original images are in a tri-chromatic color coordinate system (e.g., an RGB color coordinate system, an R'G'B' color coordinate system, etc.). In that case, the process 200 of some embodiments converts the images from a tri-chromatic color coordinate system into images in a color coordinate system with an achromatic brightness component and two chromatic components (e.g., a luminance, blue-chroma, red-chroma color coordinate system such as YCbCr or a luma, blue-chroma, red-chroma color coordinate system such as Y'CbCr). The application in some embodiments performs the conversion on a pixel by pixel basis. For example, each pixel in an RGB color coordinate system has three values, representing the red, blue, and green chromatic component values of the pixel. The conversion operation of some embodiments uses these values to convert each pixel in the RGB image to a pixel in a YCbCr color coordinate system that has a brightness component, a blue-chroma component, and a red-chroma component.

In some cases, the original images are in a color coordinate system other than a tri-chromatic color coordinate system or a brightness/bi-chromatic color coordinate system. For example, the image might be in a brightness, saturation, and hue color coordinate system, such as a hue-saturation-lightness (HSL) color coordinate system or a hue-saturation-value (HSV) color coordinate system. The application in some such embodiments does not adjust the chromatic and achromatic color values of pixels in such a color coordinate system. The process 200 of some such embodiments converts images from their original brightness, saturation, and hue color coordinate systems into images with a brightness component and two chromatic components (e.g., a luminance, blue-chroma, red-chroma color coordinate system such as YCbCr or a luma, blue-chroma, red-chroma color coordinate system such as Y'CbCr). Alternatively, the application in other such embodiments does adjust the values of pixels in an HSV or HSL image. In such embodiments, the process 200 does not convert the image to a brightness/bi-chromatic color coordinate system.

Similarly, the application in some embodiments may convert an image from one brightness and bi-chromatic color coordinate system to another brightness and bi-chromatic color coordinate system. For example, the contrast enhancement operations of the process of some embodiments do not adjust the color component values of images in some particular color coordinate system (e.g., YIQ). Instead, such embodiments convert such images into a different color coordinate system (e.g., YCbCr) before adjusting the images. One of ordinary skill in the art will understand that these are merely examples of color coordinate systems and that the processes of some other embodiments might embody the opposite conditions. That is, the application in some embodiments does not adjust images in a YCbCr color coordinate system, but converts the YCbCr images to YIQ images.

After converting the image into an acceptable color coordinate system the process 200 proceeds to operation 220. Similarly, when the process 200 determines (at 205) that the image is already in a brightness/bi-chromatic color coordinate system that the process can adjust without conversion, the process 200 skips the conversion operation 210. In either case, the process 200 receives (at 220) a contrast adjustment value (called "W" in the equations below). The contrast adjustment value is received from the user (e.g., via a GUI such as GUI 100). The contrast adjustment value determines how much to change the brightness values of the pixels in order to enhance the brightness contrast. The effects of specific contrast adjustment values of some embodiments are described in Section III, below.

The process 200 generates (at 230) a conversion table based on the received contrast adjustment value. The conversion table in some embodiments is a look-up table that takes original brightness values as inputs and provides corresponding adjusted brightness values as outputs. The conversion table provides an adjusted brightness value for each original brightness value. In some embodiments, the conversion table is generated from a continuous, monotonically increasing function of the original brightness (e.g., a sigmoidal function, gamma function, user defined tone response curve). Some such embodiments use a sigmoidal function to generate a conversion table. A sigmoidal function (sometimes called an "s-shaped curve") is a continuous, monotonically increasing, non-linear function, i.e., it is a curved function with no discontinuity in its range of values and with a first order derivative that is always positive (i.e., with a set of values that increase over its range). An increasing sigmoidal function over a finite range (1) starts near a lower bound, (2) rises slowly at first, (3) rises more and more rapidly until it gets to an inflection point (e.g., the midpoint) between the lower boundary and an upper boundary, and then (4) rises less and less rapidly until it is near the upper boundary. Graph examples of sigmoidal functions will be further described below by reference to FIG. 4. Alternatively, the operation of other embodiments applies any bounded non-linear function (e.g., any user defined tone response curve, etc.) to the brightness values.

The application of such a sigmoidal function to the brightness values of the pixels of an image (1) increases the brightness contrast, relative to other pixels with mid-level brightness, of pixels with mid-level brightness values; (2) decreases the brightness contrast, relative to other bright pixels, of bright pixels; (3) decreases the brightness contrast, relative to other dim pixels, of dim pixels; and (4) increases the brightness contrast between dark pixels and light pixels. In some embodiments, the higher the contrast adjustment value, the more extreme those changes in brightness contrast become.

The following equations are used in some embodiments to adjust the brightness contrast of images. The equations herein follow a convention that each variable is represented by a single letter. If a variable is an adjusted value, then a star symbol (*) follows the letter. For example, the letter "Y" represents a brightness value and "Y*" represents an adjusted brightness value. If a variables has different values for different individual pixels in the images, then an "[x,y]" follows the initial letter to indicate that their value in the equation is determined on a per pixel basis with x and y representing the coordinates of the pixel in the image. For example, Y[x,y] represents the brightness of a pixel at coordinates [x,y]. The variables with different values for different pixels are calculated for each pixel over the entire range of pixels in the image. The equations below are written with the assumption that the image has been converted to an image in a YCbCr color coordinate system. The Y, Cb, and Cr values can be scaled arbitrarily, therefore, in some embodiments Y ranges from 0 to n and Cb and Cr each ranges from −m to m, where n can be any number and (in some such embodiments) m is half of n (i.e. the range of the chroma values is from −n/2 to n/2). The equations, below, are written under the assumption that the brightness value (Y) has been scaled to a range from 0 to 1 (i.e., n equals 1). The equations involving chroma values (in Section II, below) are written under the assumption that the chroma values are scaled from −m to m, but they are not written under the assumption that the range of the chroma values have any particular relation to the range of brightness values (i.e., the range of the chroma values is not necessarily −n/2 to n/2). However, in the application in some embodiments, when the luminance values Y are scaled to a range from 0 to 1, the chroma values Cb and Cr are scaled to a range from −0.5 to 0.5.

Equations (1)-(3) generate (at 230) conversion tables in some embodiments. For a given value of W, equation (1) generates a conversion table for converting original brightness values (Y) into adjusted brightness values (Y*).

$$Y^* = f(Y, w) = \left( \frac{e^{(2Y-1)W}}{1+e^{(2Y-1)W}} - B \right) \cdot \frac{1}{T-B} \quad (1)$$

In equation (1), Y* represents the brightness value of a pixel after adjustment by the sigmoidal contrast operation. Y represents the brightness value of a pixel in the original image. The variable W represents a contrast adjustment value (e.g., the contrast adjustment value shown in contrast indicator 130 in FIG. 1). The term "=f(Y,W)" indicates that Y* is a function of the original brightness value (Y) and the contrast adjustment value (W). In any equation herein, e is the base of the natural logarithm. B and T are scaling factors that ensure that Y* ranges from 0 to 1 for Y values ranging from 0 to 1. That is, regardless of the contrast adjustment value, given a Y value of 1, the value of Y* will be 1; given a Y value of 0, the Y* value will be 0; and given a Y value between 0 and 1, the Y* value will be between 0 and 1.

B and T compensate for changes to the scale of the Y* that would otherwise result from applying different contrast adjustment values W. Therefore these scaling factors are functions of the contrast adjustment value W. The process 200 of some embodiments generates the scaling factors B and T with equations (2) and (3).

$$B = \frac{e^{-W}}{1+e^{-W}} \quad (2)$$

$$T = \frac{e^{W}}{1+e^{W}} \quad (3)$$

In order to reduce the number of variables in equation (1), equations (2) and (3) are shown as separate equations from equation (1). However, one of ordinary skill in the art will understand that some embodiments apply equations (1), (2), and (3) as a single calculation rather than calculating B and T separately.

For a given contrast adjustment value (W), Y* can be represented as a function of Y (e.g., Y* can be represented as f(Y)) with W as a constant in the function. Accordingly, different contrast adjustment values (W) result in different conversion tables for converting brightness values from Y to Y*.

For any conversion table generated by equations (1)-(3), there are some constant characteristics. For example, (i) for original brightness values greater than 0.5, the ratio of Y* to Y is greater than 1, (ii) for original brightness values less than 0.5, the ratio of Y* to Y is less than 1, and (iii) for original brightness values equal to 0.5, the ratio of Y* to Y is equal to 1. In other words, bright (above 0.5 brightness value) pixels get brighter, dim (below 0.5 brightness value) pixels get dimmer, and middle value (0.5 brightness value) pixels stay the same.

The magnitude of the W value in equations (1)-(3) affects how much brighter the bright pixels will get, etc. For example, as W approaches 0, the change in the brightness contrast from the original image approaches 0. As W becomes large, the function shown in equation (1) approaches a step function. That is, for very large values of W, dim pixels in the original image (brightness value less than 0.5) are dimmed to black pixels in the adjusted image and bright pixels (brightness value of more than 0.5) are brightened to white pixels in the adjusted image. Graphical representations of various conversion tables generated from equation (1) with various intermediate contrast adjustment values are provided in FIG. 4, described below. In some embodiments, the values of W are limited to a range between 0.324 and 40. In other embodiments, other ranges of the values of W are permitted. The slider 120 in the GUI 100 of some embodiments covers a set range of available values of W. In some such embodiments, the user can set a value of W outside of the specified range by using another control (e.g., by directly entering the value in contrast indicator 130).

Once a conversion table is generated, the process 200 adjusts (at 240) the Y value of each pixel in the image according to the conversion table generated in operation 230. In some embodiments, the process performs this adjustment by generating a new image based on the original image, but with the Y value of each pixel in the original image converted to a Y* value in the new image (e.g., using the conversion table generated by equations (1)-(3)). The equation of some embodiments for generating a new brightness value is:

$$Y^*[x,y]=f(Y[x,y]) \quad (4)$$

In equation (4), the brightness value of each individual pixel is adjusted using a function (or conversion table) calculated using equations (1)-(3). The brightness value (Y[x,y]) of a pixel at coordinates [x,y] is used as an input for the conversion table and the output of the conversion table is the adjusted brightness value (Y*[x,y]) for a corresponding pixel in the new image. After adjusting the brightness values, the process 200 ends.

While equation (4) is described as using a conversion table generated with equations (1)-(3), one of ordinary skill in the art will understand that equation (4) can use a conversion table generated by a different equation or set of equations. For example, a conversion table could be generated in some embodiments from any function of the brightness values.

The process 200 was described as converting an image in an RGB color coordinate system to an image in a YCbCr color coordinate system, however, one of ordinary skill in the art will understand that other color coordinate systems can be used within the scope of the invention. For example, some embodiments use a gamma corrected R'G'B' color coordinate system rather than a non-gamma corrected RGB color coordinate system. Similarly, the above-described embodiments perform adjustments on images in a color coordinate system with luminance, red-chroma, and blue-chroma, but some embodiments perform adjustments on luma components of gamma corrected images (e.g., images in a Y'CbCr color coordinate system). For example, the application in some embodiments converts images in an R'G'B' color coordinate system into images in a Y'CbCr color coordinate system and then adjusts the images in the Y'CbCr color coordinate system. Alternatively, after obtaining the Y'CbCr data from the R'G'B' data, the application in some embodiments performs a linearization operation to convert the luma values Y' to luminance values Y, and then performs the contrast operation on the YCbCr format of the pixel data.

In still other embodiments the application operates on images in other color coordinate systems instead of or as well as operating on images in a YCbCr or Y'CbCr color coordinate system. The equations described with respect to process 200 are described with the assumption that the brightness values (Y) are scaled from 0 to 1. However, one of ordinary skill in the art will understand that other scales for brightness values (Y) are used in some embodiments. The equations of such embodiments are adjusted to compensate for the different brightness scales.

While the process is described as "adjusting" the brightness values of the pixels, some embodiments generate a new image based on the original image rather than overwriting the original brightness values in the original image. The original image is kept unmodified in some embodiments, so that adjustments to the contrast for each different contrast setting are performed on the original image. This might be done in order to avoid artifacts and data loss that would occur if multiple contrast adjustments were performed sequentially.

While the above process 200 is described with operations in a particular order, one of ordinary skill in the art will understand that in other embodiments other orders are possible. Furthermore, some operations shown as one operation in FIG. 2 may be split into multiple operations in other embodiments. Similarly, some operations shown as separate operations in FIG. 2 may be combined into a single operation in other embodiments. For example, in some embodiments, a single operation adjusts the brightness values based on the received contrast adjustment value rather than one operation 230 generating a conversion table and another operation 240 adjusting the brightness values.

The process 200 was described as generating a conversion table once a given value of W was received. Such a conversion table takes brightness values as inputs and gives adjusted brightness values as outputs. Because the conversion table accepts one input value for a given output value the conversion table is a one-dimensional look-up table. However, one of ordinary skill in the art will understand that the application in some embodiments uses a pre-calculated conversion table that includes adjusted brightness values Y* for different Y values and different W values. Such a conversion table is a two-dimensional look-up table. For example, such a table would include the Y* values for a W of 4 and a Y of 0.3 as well as the Y* values for a W of 3 and a Y of 0.2, etc. Because the processes of such embodiments use a pre-calculated, two-dimensional look-up table the application does not have to calculate a new look-up table for each newly set value of W. Accordingly, in some such embodiments, operation 230 is not performed. Alternatively, some embodiments perform the above described calculations on the brightness values directly, without generating a conversion table.

II. Chromatic Color Component Adjustment

The above described process 200 adjusts the brightness values of the pixels in an image by selectively increasing (or decreasing) the brightness values. In addition to adjusting the brightness values of the pixels, the application in some embodiments also adjusts the chromatic values (e.g., blue-chroma values and red-chroma values in a YCbCr color coordinate system) of those pixels. If the brightness adjustments, but not the chromatic adjustments, were performed, the colors of the adjusted image would look oversaturated and/or faded. The colors of some pixels would look faded because increasing the brightness value of a pixel increases the amount of white light (achromatic brightness) in the pixel. Without a corresponding increase in the chromatic values, the white light becomes a larger portion of the total light of the pixel. For example, red pixels become pink pixels and blue pixels become light-blue pixels. Similarly, a decrease in the brightness value of a pixel without a corresponding decrease in the chromatic values of the pixel can leave the pixel looking oversaturated. For example, pink pixels become red pixels and light-blue pixels become dark-blue pixels. Therefore, the contrast adjustment processes of some embodiments adjust the chromatic values of an image as well as the brightness values of the image in order to prevent fading or oversaturation.

Figure 3:
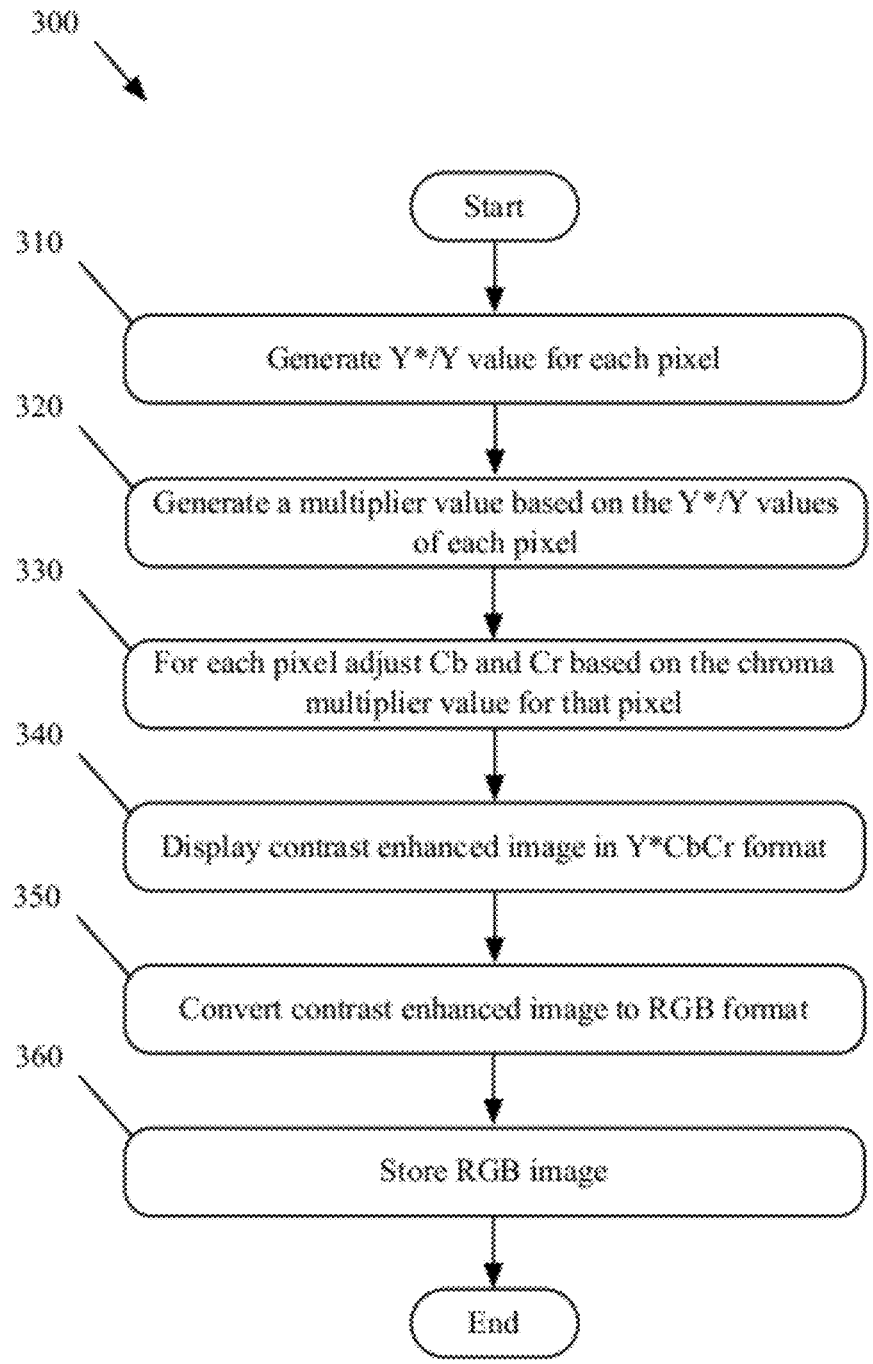
FIG. 3 conceptually illustrates a process 300 of some embodiments for adjusting the chromatic values of individual pixels.

The application in some embodiments adjusts the chromatic values of a pixel based on the relative change (e.g., fractional change) of the brightness value of that pixel during the brightness adjustment operation. FIG. 3 conceptually illustrates a process 300 that the application in some embodiments uses to adjust the chromatic values of individual pixels. The process 300 adjusts the chromatic values in accord with adjustments to the brightness values (e.g., by process 200). For example, the process 300 of some embodiments adjusts the chromatic values (e.g., Cb and Cr values) of each pixel based on the ratio of adjusted brightness value to original brightness value of that pixel. The process 300 applies equations (5)-(7) to the chromatic values of each pixel to adjust the chromatic contrast. Equations (5)-(6) generate a chromatic multiplier value (M[x,y]) for each pixel. The chromatic multiplier value (M[x,y]) for each pixel is based on the relative brightness adjustment of that pixel (e.g., the ratio of the adjusted brightness value to the original brightness value). The chromatic values of each pixel are then multiplied by the corresponding chromatic multiplier value (M[x,y]) in equations (7A) and (7B).

Accordingly, for each pixel, the process 300 of some embodiments generates (at 310) a ratio of the adjusted brightness value (Y*) of that pixel to the original brightness value (Y) of that pixel.

$$D[x, y] = \frac{Y^*[x, y]}{Y[x, y]} \tag{5}$$

In equation (5), D[x,y] represents the ratio of the adjusted brightness value (Y*[x,y]) for a pixel in the new image to the brightness value (Y[x,y]) of the corresponding pixel at coordinates [x,y] in the original image. This ratio is an example of the fractional change mentioned briefly, above. As described in Section I, if the process 200 determines Y* using equations (1)-(3), then (i) for original brightness values greater than 0.5, the ratio of Y* to Y is greater than 1, (ii) for original brightness values less than 0.5, the ratio of Y* to Y is less than 1, and (iii)

for original brightness values equal to 0.5, the ratio of Y* to Y is equal to 1. Accordingly, in such embodiments, D[x,y] is greater than 1 for pixels above 0.5 brightness, less than 1 for pixels below 0.5 brightness and equal to 1 for pixels at 0.5 brightness. Accordingly, it is possible for the fractional change (e.g., the ratio) to be greater than one, less than 1, or equal to 1.

The application in some embodiments does not use D[x,y] alone as a multiplier. Using the ratio D[x,y] alone as a multiplier results in a wide variation in chromatic adjustments. Therefore, in some embodiments, a saturation adjustment value, u, is used to moderate the effect of the large range of D[x,y] values generated by pixels with different brightness values. The saturation value is between 0.3 and 0.7 in some embodiments. For example, in some embodiments the saturation value (u) is 0.5. Other embodiments use a saturation value greater than 0.7 or less than 0.3. The application in some embodiments uses different saturation values under different circumstances. Some such embodiments determine the value of the saturation value (u) based on some characteristic of the image. For example, some embodiments use one saturation value when the average (or the median) brightness is below a threshold and a different saturation value when the average (or the median) brightness is above the threshold. Still other embodiments allow a user to set the saturation value instead of or in addition to having pre-set saturation values or saturation values calculated by the application for the particular image. The saturation value (u) is used with the ratio D[x,y] in some embodiments to generate a chromatic multiplier value of a pixel.

Therefore, once the ratio D[x,y] is known for a particular pixel, the application in some embodiments then uses the ratio to generate (at 320) a chromatic multiplier value for the chromatic values of each pixel. The application in some embodiments uses equation (6) to determine the chromatic multiplier value (M[x,y]).

$$M[x,y]=D[x,y]+(1-D[x,y])u \quad (6)$$

In equation (6), M[x,y] represents the chromatic multiplier value to be used later to adjust the chromatic values (e.g., red-chroma values and blue-chroma values) of a pixel at coordinates [x,y]. In an embodiment in which process 300 implements equation (6), the chromatic multiplier value M[x,y] is (i) greater than 1 when D[x,y] is greater than 1, (ii) less than 1 when D[x,y] is less than 1, and (iii) equal to 1 when D[x,y] is equal to 1. In embodiments in which the application implements equations (1)-(6), because of the previously described characteristics of Y* and D[x,y] with respect to Y[x,y], the value of M[x,y] is (i) greater than 1 when Y is greater than 0.5, (ii) less than 1 when Y is less than 0.5, and (iii) equal to 1 when Y is equal to 0.5.

Though the above-described equation (6) does not use D[x,y] itself as a chromatic multiplier value, the application in other embodiments uses D[x,y] as a chromatic multiplier value (M[x,y]). The application in still other embodiments uses D[x,y] times a saturation value (u) as a chromatic multiplier value (M[x,y]), or uses a chromatic multiplier value (M[x,y]) derived from some other function of D[x,y].

After the chromatic multiplier values M[x,y] are determined for an image, the original chromatic values of that image are adjusted (at 330) based on the chromatic multiplier values M[x,y] of the pixels. The application in some embodiments uses equations (7A) and (7B) to adjust the chromatic values.

$$Cb^*[x,y]=Cb[x,y] \cdot M[x,y] \quad (7A)$$

$$Cr^*[x,y]=Cr[x,y] \cdot M[x,y] \quad (7B)$$

In equation (7A), Cb[x,y] represents the blue-chroma value of a pixel at coordinates [x,y] in the original image. Cb*[x,y] represents the blue-chroma value of a pixel at coordinates [x,y] after the blue-chroma has been adjusted. In equation (7B), Cr[x,y] represents the red-chroma value of a pixel at coordinates [x,y] in the original image. Cr*[x,y] represents the red-chroma value of a pixel at coordinates [x,y] after the red-chroma has been adjusted. The chromatic multiplier value (M[x,y]) is based on the change in the brightness value of the pixel at coordinates [x,y], not on the original chromatic values of that pixel. Accordingly, two pixels with the same original chromatic values (e.g., Cb and Cr values) can have different adjusted chromatic values (e.g., Cb* and Cr* values). For applications in embodiments that implement equations (7A) and (7B), chromatic multiplier values (M[x,y]) greater than 1 increase the magnitude of the chromatic values of the pixel at coordinates [x,y], chromatic multiplier values (M[x,y]) less than 1 decrease the magnitude of the chromatic values, and chromatic multiplier values (M[x,y]) equal to 1 do not change the magnitude of the chromatic values.

As described above, applications in embodiments that implement equations (1)-(6) produce chromatic multiplier values that are (i) greater than 1 for pixels with brightness values above 0.5, (ii) less than 1 for pixels with brightness values below 0.5, and (iii) equal to 1 for pixels with brightness values equal to 0.5. Accordingly, multiplying a chromatic value (either a positive chromatic value or a negative chromatic value) of a bright (brightness value above 0.5) pixel by M[x,y] increases the magnitude of the chromatic value. In such embodiments, multiplying a chromatic value (positive or negative) of a dim (brightness value below 0.5) pixel by M[x,y] decreases the magnitude of the chromatic value. In such embodiments, multiplying a chromatic value (positive or negative) of a mid-level (brightness value equal to 0.5) pixel by M[x,y] decreases the magnitude of the chromatic value.

The chromatic multiplier values of an image are based on the brightness of the pixels of the image. Graphical representations of the relationship between the initial brightness value (Y) of an image and the multiplier are found in FIGS. 4 and 5, described in Section III, below. Accordingly, the multiplier M will be further described below in Section III.

Once the adjusted chromatic values (e.g., Cb* and Cr* values) have been generated, the process 300 of some embodiments displays (at 340) the image on a display device (e.g., in a GUI such as the GUI 100 in FIG. 1). In some embodiments the displayed image is a preview image that is provided to allow a user to make further adjustments to the contrast (or other characteristics of the image) before saving the image. Once the user is satisfied that the image looks the way the user desires, some embodiments allow the user to save the image. In some such embodiments, before saving the image, the process converts (at 350) the image into an RGB color coordinate system. The image is then saved (at 360) in the RGB color coordinate system. The process 300 then ends Equations (4)-(7B) are explained above in terms that include references to equations (1)-(3), which provide specific equations for adjusting the contrast of the brightness values of an image. However, one of ordinary skill in the art will understand that while some embodiments use equations (4)-(7B) in conjunction with sigmoidal contrast equations (1)-(3), the equations (4)-(7B) can also be used in some embodiments with any other contrast adjusting equations (e.g., gamma correction functions, lift and gain functions, etc.).

Processes 200 and 300 are described above as separate processes. Process 200 adjusts the brightness values of all the pixels in an image and then process 300 adjusts the corresponding chromatic values (e.g., red-chroma and blue-chroma values of a YCbCr image) for all the pixels in the image. However, one of ordinary skill in the art will understand that the application in some embodiments combines the processes 200 and 300 into a single process. For example, the application in some embodiments adjusts both the brightness value and the chromatic values of a given pixel before adjusting the brightness value of the next pixel. Adjusting all values for a given pixel is possible because in some embodiments, all the adjusted values of a pixel depend on the original values of the pixel, not on the original values of any other pixel. Similarly, in some embodiments, a given pixel of an RGB image is (1) converted to a brightness/chromatic color coordinate system, (2) has its brightness and chromatic values adjusted, and (3) is converted back into an RGB color coordinate system before another pixel is converted from an RGB color coordinate system to a brightness/chromatic color coordinate system. Still other embodiments perform both conversion and adjustment processes on small groups of pixels before performing conversion and adjustment processes on other groups of pixels.

Processes 200 and 300 are described as adjusting brightness and chromatic values of brightness/bi-chromatic images. However, one of ordinary skill in the art will understand that the processes 200 and 300 of some embodiments adjust brightness and chromatic values of images in a color coordinate system that uses brightness, saturation, and hue (e.g., an HSV or HSL system). The processes 200 and 300 of such embodiments apply a non-linear function to the brightness values of the image, and apply a multiplier (e.g., M) to the saturation values of the image. Such embodiments do not apply the multiplier to the hue values of the image because adjusting the hue value of a pixel (e.g., from red to blue) is not desired; in these embodiments, only the adjustment of the brightness and saturation is desired.

The adjustments of brightness and chromatic values have been described above with mathematical examples. To clarify the effects of the application of some of those mathematical functions to the brightness values, the next section describes figures that show graphs of the example functions that convert Y into Y* and Y into M.

III. Conversion Graphs

The processes 200 and 300 described above adjust the brightness and chromatic values of the pixels of an image according to various functions that depend on the original brightness values of the image. Equation (1) also depends on a contrast adjustment value (W). For any given contrast adjustment value (W), equation (1) above can be represented as a graph to demonstrate the effect of that contrast adjustment value (W) on different brightness values (Y). Each contrast adjustment value results in a different brightness adjustment function for adjusting the brightness values (Y). These different functions can be represented as graphs of adjusted brightness values (Y*) versus original brightness values (Y). Similarly, the effects of different contrast adjustment values (W) on chromatic multiplier values can be represented as a set of graphs. The value of M[x,y] is ultimately dependent on the original brightness value of the pixel (Y[x, y]), the contrast adjustment value (W) and the saturation value (u). Therefore, for a given contrast adjustment value (W) and saturation value (u) the chromatic multiplier values can be represented as a graph of chromatic multiplier values (M) versus original brightness values (Y).

Figure 4:
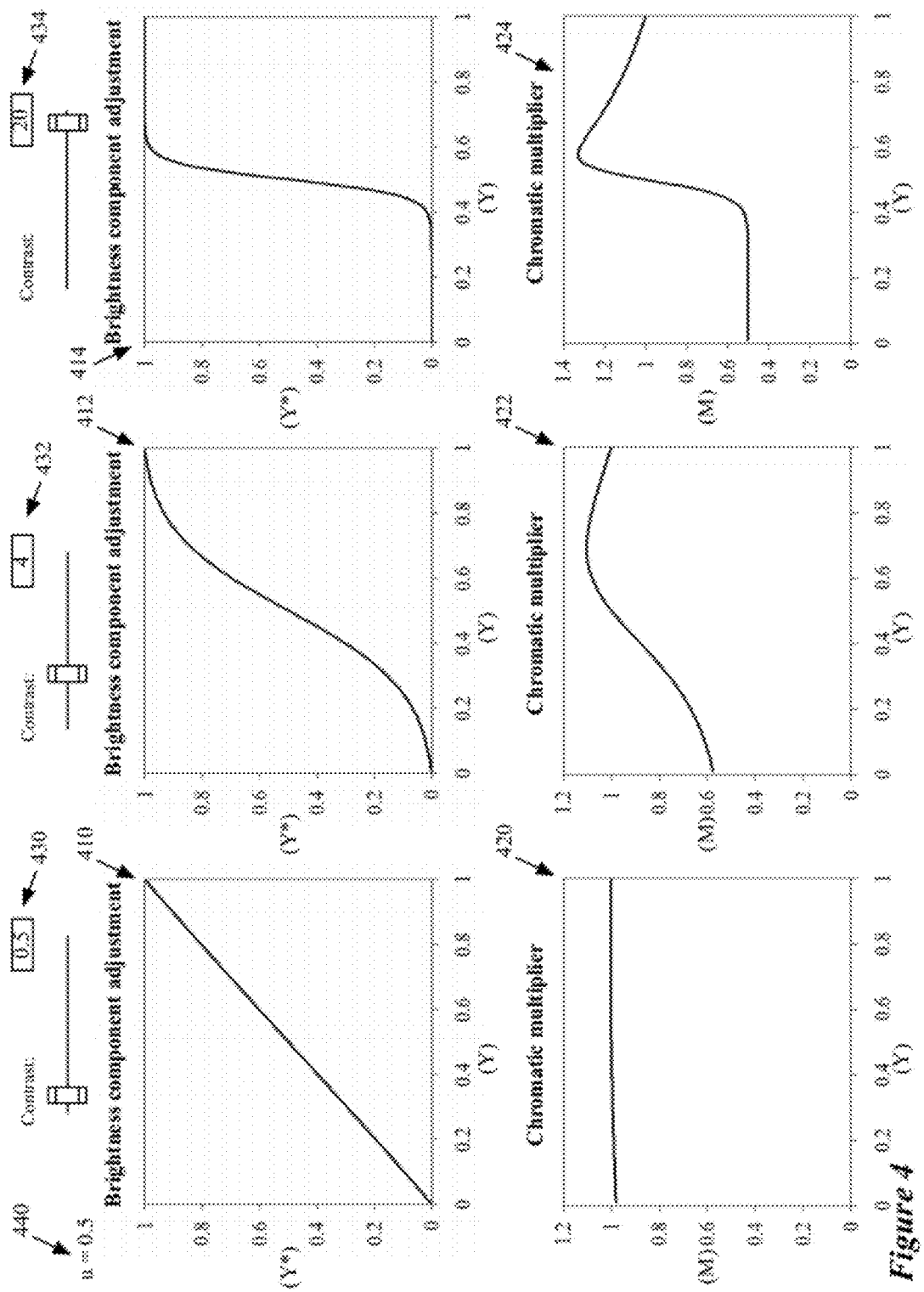
FIGS. 4-5 graphically illustrate conversion functions and chromatic multiplier functions for different contrast adjustment settings.
Figure 5:
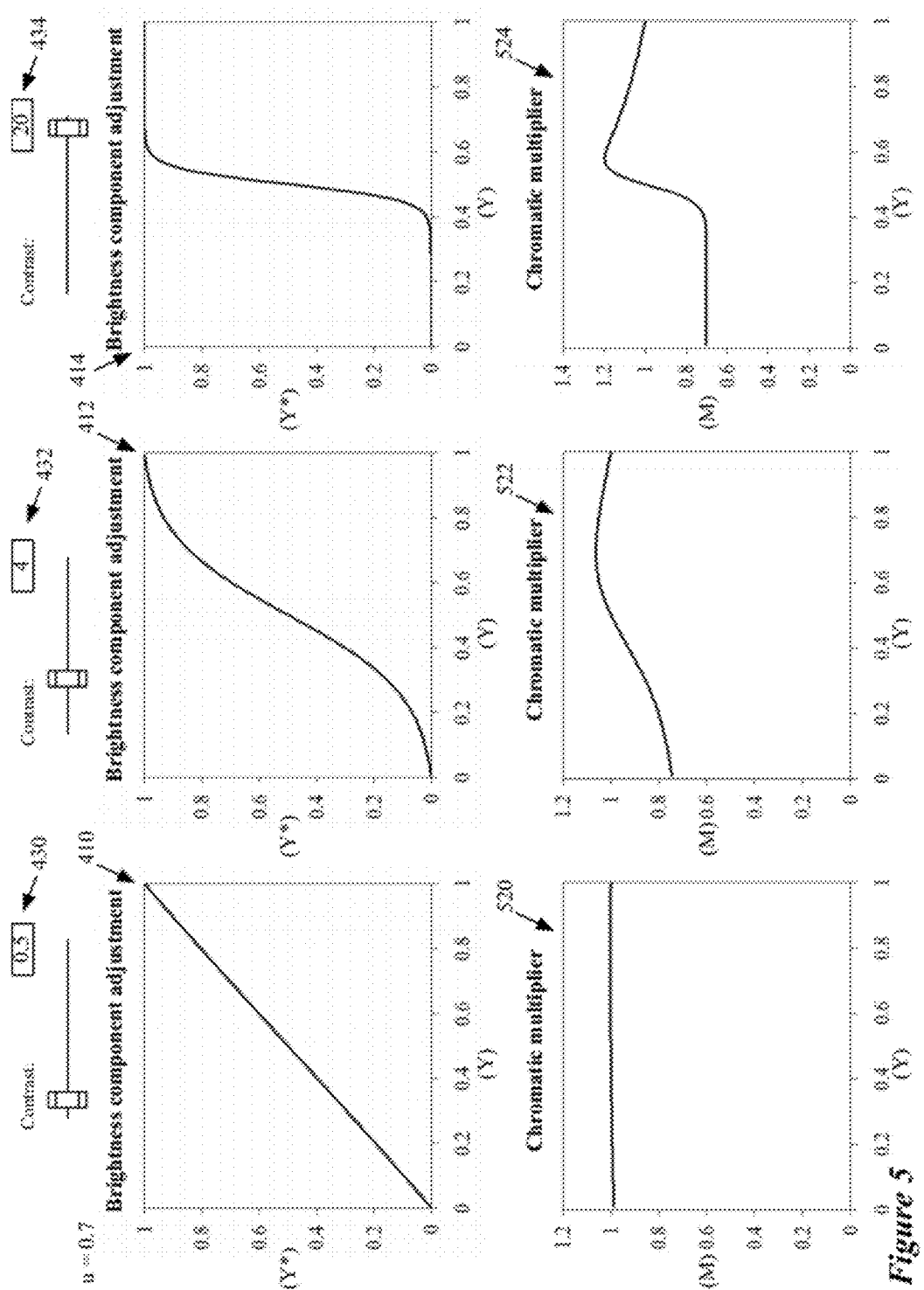

FIGS. 4 and 5 graphically illustrate conversion functions and chromatic multiplier functions for different contrast adjustment settings. FIG. 4 illustrates graphs generated from the equations when the saturation value (u) was set to 0.5. FIG. 5 illustrates graphs generated from the equations when the saturation value (u) was set to 0.7.

FIG. 4 includes graphs 410, 412, 414, 420, 422, 424, contrast indicators 430, 432, and 434, and saturation value 440. Graphs 410-414 conceptually show brightness adjustment functions of some embodiments. The contrast indicators 430-434 show the contrast adjustment values used in generating the graphs 410-424 below the respective contrast indicators 430-434. Saturation value 440 identifies the saturation value (u) used in generating the chromatic multiplier graphs.

A. Brightness Adjustment Graphs

In each of the graphs 410-414, the adjusted brightness value (Y*) of a pixel can be determined by selecting an original brightness value (Y) of the pixel on the horizontal axis and identifying the corresponding adjusted brightness value (Y*) along the vertical axis. For example, in graph 412, an original brightness value of 0.2 yields an adjusted brightness value of approximately 0.067.

Graph 410 shows a brightness adjustment function for a contrast adjustment value of 0.5 (as shown by contrast indicator 430). With a contrast adjustment value of 0.5, the brightness adjustment function is almost a straight line with all adjusted brightness values (Y*) almost equal to the corresponding original brightness values (Y). A diagonal line on the graph on which a change in Y results in the same change in Y* indicates no change in contrast from the original image to the adjusted image. Thus, graph 410 shows that all the adjusted brightness values in graph 410 are almost the same as the original brightness values. Therefore, the graph demonstrates that a contrast adjustment value of 0.5 will have a very small effect on the brightness values of the image.

Graph 412 shows the brightness adjustment function for a contrast adjustment value of 4 (as shown by contrast indicator 432). With a contrast adjustment value of 4, the brightness adjustment function starts out with a slightly flattened (horizontal) slope. A relatively flat slope indicates that the contrast for brightness values in that part of the function will be lower after the adjustment than before the adjustment. This is because a relatively large variation in original brightness value (e.g., from a Y value of 0.0 to a Y value of 0.2) results in a relatively small variation in the adjusted values (e.g., from a Y* value of 0.0 to a Y* value of 0.067). Graph 412, as illustrated, is relatively flat at both the high end of the range and the low end of the range. Therefore the contrast between two bright pixels will be reduced as will the contrast between two dim pixels. In contrast, graph 412 is relatively steep in the middle range. A relatively steep slope indicates that the contrast for brightness values in that part of the function will be higher after the adjustment than before the adjustment. This is because a relatively small variation in original brightness value (e.g., from a Y value of 0.4 to a Y value of 0.6) results in a relatively large variation in the adjusted values (e.g., from a Y* value of 0.3 to a Y* value of 0.7).

Graph 414 shows the brightness adjustment function for a contrast adjustment value of 20 (as shown by the contrast indicator 434). With a contrast adjustment value of 20, the brightness adjustment function starts out with a very flat (horizontal) slope. A very flat slope indicates that the contrast for brightness values in that part of the function will be much lower after the adjustment than before the adjustment. This is because a relatively large variation in original brightness value (e.g., from a Y value of 0.0 to a Y value of 0.2) results in almost no variation in the adjusted values (e.g., from a Y* value of 0.0 to a Y* value of approximately 0.0). Graph 414, as illustrated, is very flat at both the high end of the range and the low end of the range. Therefore the contrast between two bright pixels will be almost eliminated as will the contrast between two dim pixels. Outside of a narrow range around a brightness value of 0.5, any bright pixels in the original image will result in white pixels in the adjusted image and any dark pixels in the original image will result in black pixels in the adjusted image. In contrast to the high and low ends of the range in graph 414, graph 414 is very steep in the middle range. A very steep slope indicates that the contrast for brightness values in that part of the function will be much higher after adjustment than before adjustment. This is because a relatively small variation in original brightness value (e.g., from a Y value of 0.4 to a Y value of 0.6) results in a very large variation in the adjusted values (e.g., from a Y* value of 0.02 to a Y* value of 0.98).

B. Chromatic Multiplier Graphs

As mentioned above, adjusting the brightness values of the pixels in an image without adjusting the chromatic values can leave brightened areas looking washed out and darkened areas looking oversaturated. Therefore, once the brightness of an image is adjusted, some embodiments adjust the chromatic values in accord with the changed brightness values. The chromatic components of the pixels of an image in some embodiments have both positive and negative values. The magnitude of the chromatic value determines how much the chromatic value changes the chromaticity of the pixel. When the application reduces the brightness of a pixel, it also reduces the amount of chromaticity of the pixel (i.e., the magnitudes of the chromatic values) in order to avoid oversaturation. Similarly, when the application increases the brightness of a pixel, it also increases the amount of chromaticity of the pixel in order to avoid washing out the color of the pixel. The application in some embodiments increases or decreases the magnitudes of the chromatic values in an image by multiplying the chromatic values of each pixel by a number (M) that is a function of the brightness value (Y) of the original pixel.

The chromatic multiplier (M) shown in equation (6) is ultimately dependent on the original brightness value (Y). For clarity, equations (5) and (6) have been combined in equation (8) to show how the chromatic multiplier (M) values depend on the original brightness values (Y).

$$M = \frac{Y^*}{Y} + \left(1 - \frac{Y^*}{Y}\right)u = \frac{f(Y)}{Y} + \left(1 - \frac{f(Y)}{Y}\right)u \quad (8)$$

In equation (8), M represents the chromatic multiplier for adjusting chromatic values. Y* represents the adjusted brightness value of a pixel with original brightness value Y. f(Y) represents an arbitrary function of Y that generates Y*. Since the chromatic multiplier graphs in FIGS. 4 and 5 show the M values versus Y values, it is unnecessary to calculate the M values relative to specific pixels to generate the graph. Therefore [x,y] coordinates are omitted in this equation. While the brightness channel adjustment graphs 410-414 of FIG. 4 show direct conversion values from Y to Y*, the chromatic multiplier graphs 420-424 do not show the direct conversion values from Cr to Cr* (or Cb to Cb*). Instead, the chromatic multiplier graphs show values by which the chromatic of a pixel will be multiplied based on the brightness value of the pixel. Because the chromatic multiplier value is not based on the chromatic values of a pixel, two pixels with the same original chromatic values can have different adjusted chromatic values.

For example, an original image has a pixel with a brightness value of 0.2, a red-chroma value of −0.4 and a blue-chroma value of 0.3. If the example pixel is adjusted with a contrast adjustment value of 4, then the brightness value of the pixel will be reduced significantly (from 0.2 in the original image to 0.067 in the adjusted image, as shown in graph 412). In that example, the corresponding chromatic multiplier value (M) in graph 422 is 0.67. Therefore the chromatic values of the adjusted pixel would be a red-chroma value, Cr*, of −0.268 (adjusted from an original value of −0.4) and a blue-chroma value, Cb*, of 0.201 (adjusted from an original value of 0.3). Graph 422 shows chromatic multiplier values greater than 1 for brightness values greater than 0.5 (e.g., brightness values that are increased by the sigmoidal contrast adjustment). Therefore, a different example pixel with the same original chromatic values (Cb of −0.4 and Cr of 0.3) as the first example pixel, but a different original brightness value (e.g., a Y value of 0.7), would have different adjusted chromatic values. In such a case, as the graph 422 shows, the chromatic multiplier value (M) is 1.1. Accordingly the second sample pixel would have an adjusted chromatic value, Cb*, of −0.44 and an adjusted chromatic value, Cr*, of 0.33. In more general terms, some embodiments perform a contrast adjustment operation that adjusts the chromatic values of each pixel based on the adjustment of the brightness value of that pixel.

Graph 420 shows chromatic multiplier values for a contrast adjustment operation that does not significantly change the contrast of the image. Because the chromatic multiplier (M) is based on the ratio of the adjusted brightness value (Y*) to the original brightness value (Y), the chromatic multiplier stays close to 1 when the contrast brightness values change very little. The first example pixel had a brightness of 0.2. The chromatic multiplier (M) for a pixel with brightness value of 0.2 is about 0.99. Therefore the chromatic values of the example pixel would be a red-chroma value of −0.396 and a blue-chroma value of 0.297.

Graph 424 shows chromatic multiplier values for a contrast adjustment operation that changes the contrast of the image by a large amount. As the graph 424 shows, when the adjusted brightness value drops to 0, the chromatic multiplier drops to a minimum that is equal to the saturation value (u). The minimum value is equal to u because equation (8) reduces to u when Y* is zero. Accordingly, the graph 424 shows the chromatic multiplier (M) at 0.5 (the set value of u) when the brightness value is below about 0.4. Therefore the chromatic values of the example pixel (with brightness 0.2) would be a red-chroma value of −0.2 and a blue-chroma value of 0.15.

As mentioned above, different saturation values (u) are possible in the same embodiment or in different embodiments. Accordingly, FIG. 5 illustrates chromatic multiplier graphs generated with a saturation value (u) of 0.7. The only change to the functions used to generate the graphs of FIG. 5 from the functions used to generate FIG. 4 is the change to the saturation value. The saturation value does not affect the adjustment of the brightness values, therefore, graphs 410-414 are unchanged from FIG. 4. FIG. 5 includes chromatic multiplier graphs 520, 522, and 524. As the graphs 520-540 show, a larger saturation value (u) in this figure results in multipliers (M) that are closer to 1 than the corresponding multipliers in graphs 420-424 of FIG. 4. For example, the minimum chromatic multiplier value (M) in graph 524 is 0.7, instead of 0.5 as in graph 424. The farther a chromatic multiplier value (M) is from 1, the greater the change in the chromatic values adjusted by that multiplier. Therefore, a higher saturation value (u) of FIG. 5 will result in smaller adjustments to the chromatic values of the pixels in an image.

The above sections described processes that convert images from one color coordinate system to another, adjust the brightness and chromatic components of the images, and convert the resulting images back to their original format. The following Section IV briefly summarizes the various changes to the original images, which images are used to generate each converted image, and which components of the various images are used to generate other components of the various images.

IV. Conversion Summary

Figure 6:
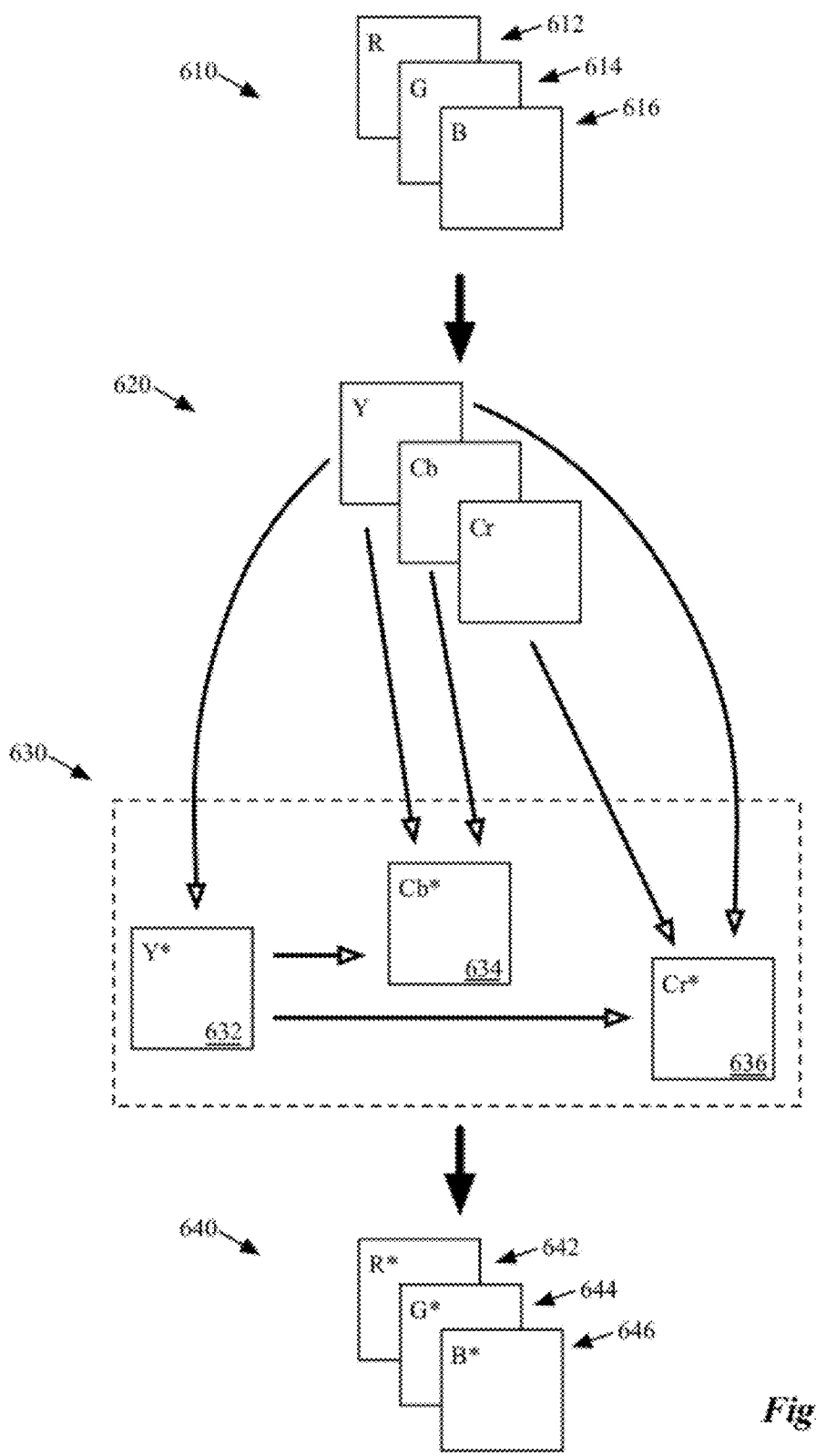
FIG. 6 conceptually illustrates the relationships between various images generated in the contrast adjustment process.

FIG. 6 conceptually illustrates the relationships between various images generated in the contrast adjustment process. The figure shows the changes in the color coordinate system of images and changes to the brightness and chromatic values of images during the above described contrast adjustment processes. The figure includes RGB image 610, red component 612, green component 614, blue component 616, YCbCr image 620, brightness (Y) component 622, blue-chroma (Cb) component 624, and red-chroma (Cr) component 626, Y*Cb*Cr* image 630, adjusted brightness (Y*) component 632, adjusted blue-chroma (Cb*) component 634, adjusted red-chroma (Cr*) component 636, and adjusted R*G*B* image 640, adjusted red (R*) component 642, adjusted green (G*) component 644, and adjusted blue (B*) component 646. Most relationships in this figure are indicated by small connecting arrows. However, to reduce what would otherwise be a confusing number of arrows, when all three components of one image are used to generate each component of another image, a single large arrow is used instead.

The processes of some embodiments start with an RGB image 610. Data from each component 612, 614, and 616 of the RGB image 610 is used to generate each component of the YCbCr image 620 (e.g., as in operation 210 in FIG. 2). This relationship is indicated in the figure by a large arrow pointing from the RGB image 610 to the YCbCr image 620. Data from the brightness (Y) component 622 is then used to generate adjusted brightness (Y*) component 632 (e.g., as in operation 240 of process 200). Data from the adjusted brightness (Y*) component 632, brightness (Y) component 622, and blue-chroma (Cb) component 624 are used to generate adjusted blue-chroma (Cb*) component 634 (e.g., as in operation 330 of process 300). Data from the adjusted brightness (Y*) component 632, brightness (Y) component 622, and red-chroma (Cr) component 626 are used to generate adjusted red-chroma (Cr*) component 636 (e.g., as in operation 330 of process 300).

Data from each of adjusted brightness (Y*) component 632, adjusted blue-chroma (Cb*) component 634, and adjusted red-chroma (Cr*) component 636 are used to generate each component 642, 644, and 646 of adjusted R*G*B* image 640 (e.g., as in operation 350 of process 300). This relationship is indicated on the graph by a large arrow pointing from the Y*Cb*Cr* image 630 to the R*G*B* image 640.

V. Software Architecture

Figure 7:
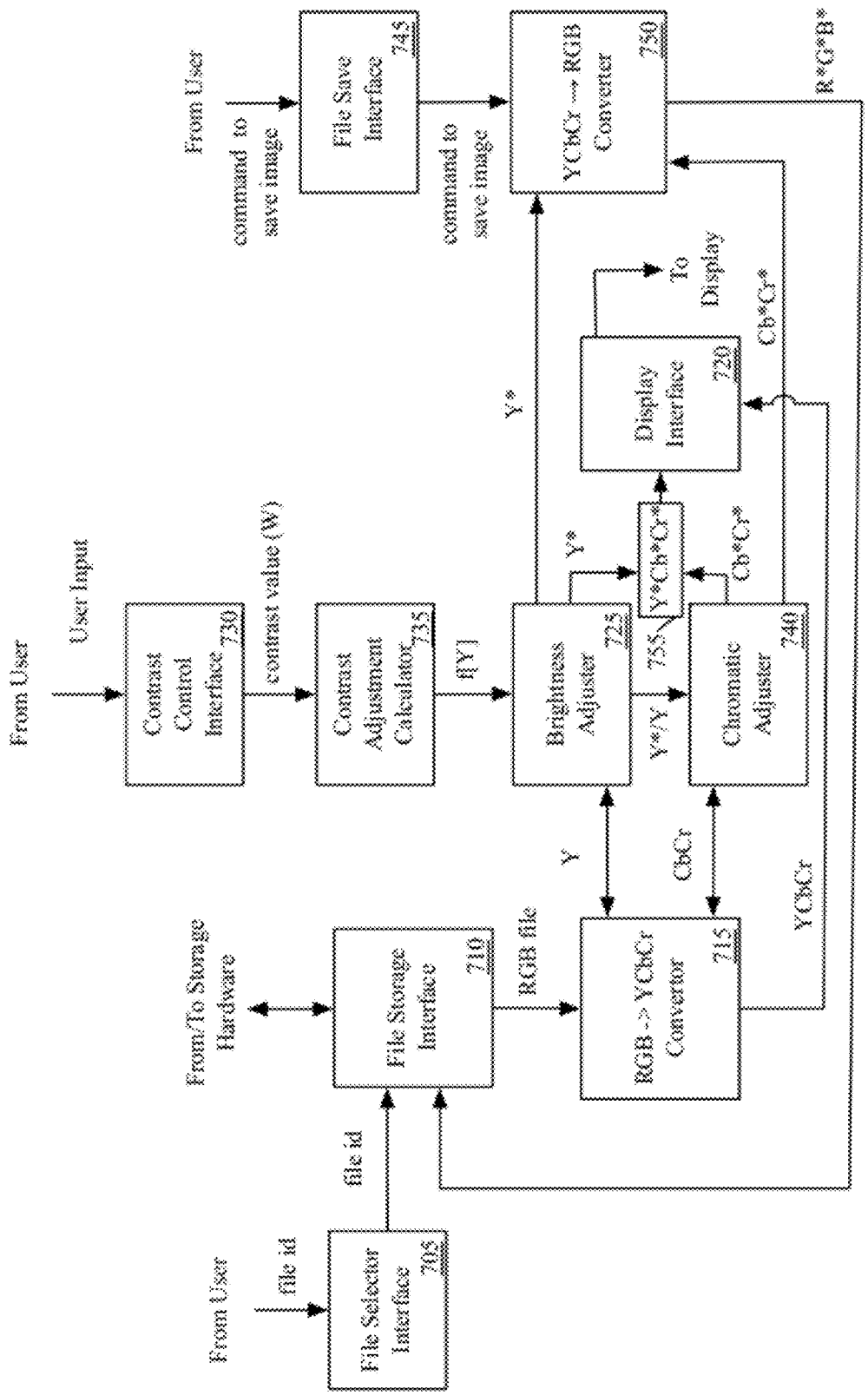
FIG. 7 conceptually illustrates the software architecture 700 of some embodiments.

The applications described in the previous sections can be executed in some embodiments on a computer system. To execute such applications using the computer system, some embodiments provide a computer program on a computer readable medium. The computer program on the computer readable medium of some embodiments can be illustrated as a software architecture diagram. FIG. 7 conceptually illustrates the software architecture 700 of some embodiments. In some embodiments, the software performs the contrast adjustment operations described above. To perform these operations, the software includes a file selector interface 705, a file storage interface 710, an RGB to YCbCr converter 715, a display interface 720, a brightness adjuster 725, a contrast control interface 730, a contrast adjustment calculator 735, a chromatic adjuster 740, a file save interface 745, and a YCbCr to RGB converter 750.

In a contrast adjustment operation, the file selector interface 705 provides a GUI control or other interface that allows a user to identify and select available files. The file selector interface 705 receives a selection of an image file. The selection is received from a user (e.g., via a cursor controller, a touchpad, or some other control). When the file selector interface 705 receives commands from a user to select an image file, the file selector interface 705 passes those commands to the file storage interface 710. The file storage interface 710 retrieves the selected image file from storage hardware that stores image files. The file storage interface 710 then passes the image file to the RGB to YCbCr converter 715. RGB to YCbCr converter 715 then performs a color coordinate system transform operation to convert the image from an RGB color coordinate system to the YCbCr color coordinate system. The RGB to YCbCr converter 715 then passes the image to display interface 720 and passes the brightness (Y) component of the image to the brightness adjuster 725. The RGB to YCbCr converter 715 also passes the chromatic (e.g., Cr and Cb) components of the image to the chromatic adjuster 740. Display interface 720 receives the image data and causes the image to be shown on a display device (e.g., a display device showing the GUI of FIG. 1).

The display device 720 allows a user to view the image so that the user can evaluate the quality of the image and adjust various image properties. In some embodiments, the display interface 720 converts images from a YCbCr format to an RGB format before passing the images to display hardware. The display interface of other embodiments sends the YCbCr images to the display hardware without converting the images. Alternatively, the RGB to YCbCr converter 715 or the file storage interface may send the RGB image to the display interface 720 instead of the RGB to YCbCr converter 715 sending the YCbCr image to the display interface 720.

When the contrast control interface 730 receives a user input and translates the user input into a contrast adjustment value (W), the contrast control interface 730 passes the contrast adjustment value (W) to the contrast adjustment calculator 735. Based on the received contrast adjustment value (W), the contrast adjustment calculator 735 of some embodiments generates a conversion table for converting the original brightness values of the image to adjusted brightness values (e.g., in operation 230). The contrast adjustment calculator 735 then passes the conversion table to the brightness adjuster 725. The brightness adjuster 725 then uses the conversion table to generate the adjusted brightness values (Y*) of each pixel. The brightness adjuster 725 of some embodiments then passes image data relating to each pixel to the chromatic adjuster 740. In some embodiments the image data represents the ratio between the adjusted brightness value of the pixel and the original brightness value. The chromatic adjuster 740 then generates new chromatic (e.g., Cb* and Cr*) components of the image in accord with the changes to the brightness values. The adjusted chromatic components and adjusted brightness components of the image are sent to the image compositor 755 by the chromatic adjuster 740 and the brightness adjuster 725. The image compositor 755 generates a complete image from the adjusted brightness values (Y*) and adjusted chromatic (e.g., Cb* and Cr*) values. The image compositor 755 then passes the complete adjusted image to the display interface 720. The display interface 720 then sends the complete adjusted image to a visual display device (not shown).

In some embodiments, the user can command the software to save the adjusted image as a new RGB file. In some such embodiments, the file save interface 745 receives the user's command to save the file. The file save interface 745 passes the command to the YCbCr to RGB converter 750. The YCbCr to RGB converter 750 retrieves the adjusted image components from the chromatic adjuster 740 and the brightness adjuster 725. The YCbCr to RGB converter 750 then performs a color coordinate system transform operation to convert the contrast enhanced Y*Cb*Cr* image into a contrast enhanced R*G*B* image. One of ordinary skill in the art will understand that although the inputs and outputs of the YCbCr to RGB converter 750 are images whose contrast has been enhanced, the YCbCr to RGB converter 750 of some embodiments can potentially convert any image in a YCbCr color coordinate system into an image in an RGB color coordinate system. Because the converter is not inherently limited to converting only Y*Cb*Cr* to R*G*B*, the star symbol (*) is not used to describe the YCbCr to RGB converter 750. After converting the image to an R*G*B* image, the YCbCr to RGB converter 750 sends the R*G*B* image to the file storage interface 710. The file storage interface 710 then saves the new file to the storage hardware.

The above described software architecture diagram includes a number of modules with a number of specific functions. However, one of ordinary skill in the art will realize that functions shown in FIG. 7 as being performed by multiple modules are performed by a single module in some embodiments. For example, in some embodiments, two or more of the file selector interface 705, the display interface 720, and the file save interface 745 are part of a single module that provides GUI controls and displays for a user. Similarly, functions shown in the figure as being performed by a single module are performed by multiple modules in some embodiments.

VI. Media Editing Application

Figure 8:
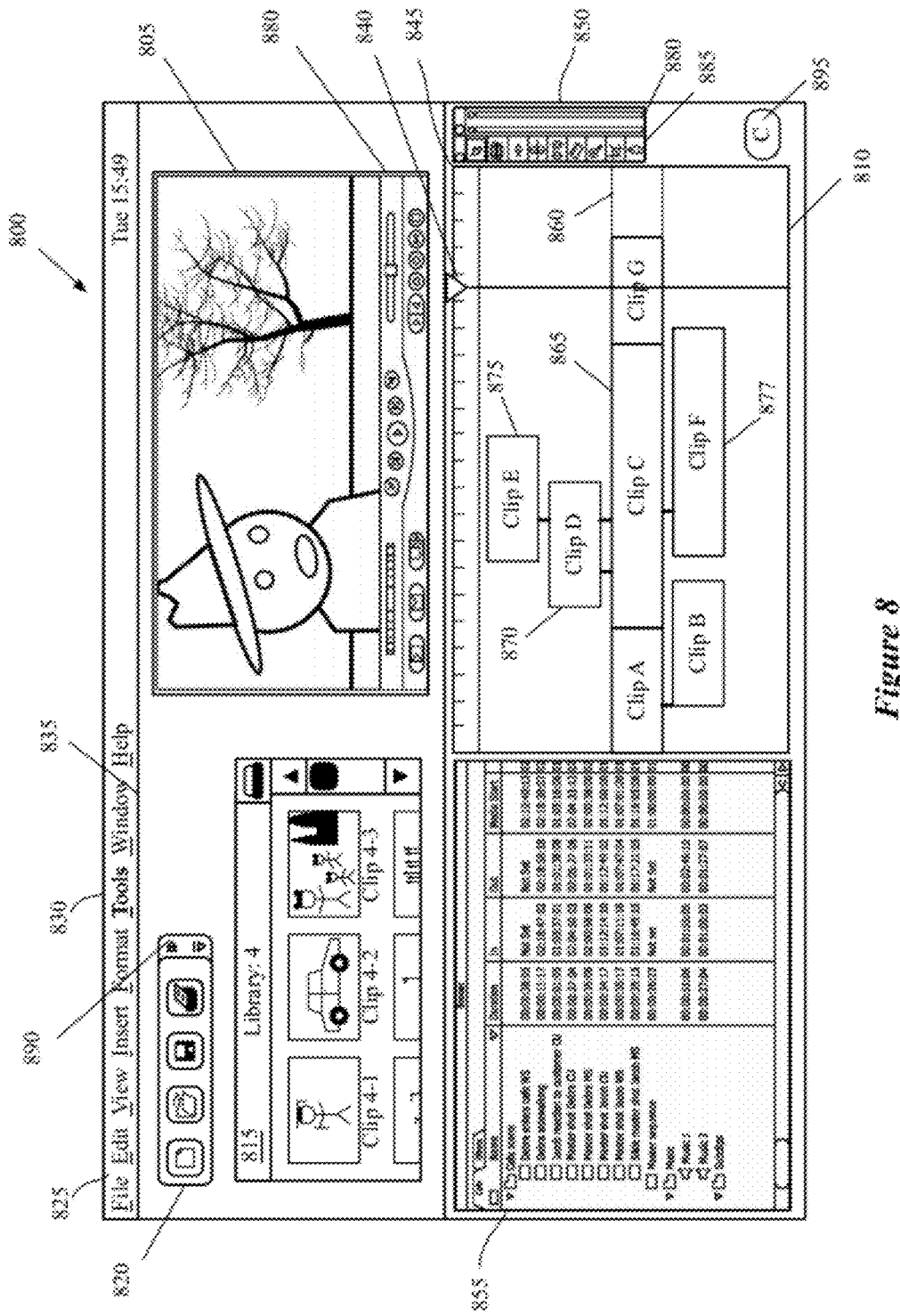
FIG. 8 illustrates a GUI of a media editing application in some embodiments.

For some embodiments of the invention, FIG. 8 illustrates a more detailed GUI 800 of a media editing application that implements the contrast-adjusting tool. Specifically, this figure illustrates one example layout of various components included in a media editing application that uses the contrast control tool of some embodiments of the invention. As shown in FIG. 8, the GUI 800 includes a preview display area 805, a composite display area 810, a playhead 840, a toolbar 850, a contrast control item 895, a menu bar 825, shortcut menu bar 820, a media library 815, and a browser window 855.

The preview display area 805 displays a preview of a composite presentation that the media editing application creates by compositing several media clips (e.g., audio clip, video). The media library 815 is an area in the GUI 800 through which the application's user can select media clips to add to a presentation that the user is compositing with the application. In the example of FIG. 8, the clips in the media library are represented as thumbnails that can be selected and added to the composite display area 810 (e.g., through a drag-and-drop operation or a menu selection operation). The clips in the media library may also be represented as a list, a set of icons, or some other representation that allows a user to view and select (e.g., through a cursor click operation, a touch operation, etc.) the various clips in the library. In some embodiments, the media library 815 may include audio clips, video clips, text overlays, pictures, and/or other media. The media library 815 may provide access to media that is stored locally or at a central location (e.g., a location accessed through a network). In some embodiments media content may be selected from locations outside the media library 815 or the GUI 800. For instance, in some embodiments a user selects media clips using other techniques (e.g., by using menu commands provided by the menu bar 825, by dragging one or more media clips from an open folder, etc.).

In some embodiments, the composite display area includes a central compositing lane 860 that spans a timeline 845 and displays a graphical representation of the composite presentation (also referred to as a "composite representation") by displaying media clips 865-877 that form the composite presentation. One or more media clips can be placed on the central compositing lane 860. In some embodiments, no two committed media clips can overlap on the central compositing lane.

Furthermore, media clips can be placed ("anchored") off of media clips placed in the central compositing lane in regions above and below the central compositing lane 860. Media clips placed in such regions are referred to as "anchored media clips." In FIG. 8, media clips 870-877 are anchored media clips. In some embodiments, horizontal areas that span the timeline in which media clips can be placed to anchor off of the central compositing lane form quasi-tracks that are sometimes referred to as "anchor lanes." The media clips of some embodiments can be anchored off of other anchored media clips. For example, in some embodiments, media clip 875 could be anchored off of media clip 870 instead of anchored directly to the central compositing lane 860.

The playhead 840 is for highlighting an instance in time in the composite representation (a representation of the composite presentation that the user is editing) that is being shown in the composite display area 810. Highlighting this instance in time is useful for a variety of reasons. For example, when viewing a preview of the composite presentation in the preview display area 805, the playhead 840 scrolls across the timeline 845 to identify the location in the composite representation in the composite display area 810 that is being currently displayed in the preview display area 805. In addition, the location of the playhead 840 also acts as an insertion point when adding clips (e.g., voice-over clip), effects, or other media to the project.

The toolbar 850 includes various buttons 880 and controls 885. These various buttons and controls are conceptual representations of UI items that allow the user to select, adjust, and/or control various aspects of the composite presentation that the media editing application creates (e.g., by selecting various options, executing various commands, specifying the values of certain parameters, etc.). In some embodiments, the toolbar includes various different controls to edit the composite presentation (e.g., by inserting clips, superimposing an image, shorten, or extend a clip, etc). As one example, the toolbar may include a set of trim tools for modifying in and out points of media clips of a composite presentation in a variety of manners.

The contrast control item 895 allows the user to invoke the contrast control tool of some embodiments of the invention. In some embodiments, this item is a user selectable UI item (such as a button, an icon, etc.) and/or an item that is selectable in a menu (e.g., a drop down menu or a contextual menu). Alternatively, or conjunctively, this contrast control item 895 can be invoked through a hot key command.

When invoked, the contrast control tool is presented to the user so that the user can adjust the color contrast of the image. Several examples of the contrast control tool were described above by reference to FIGS. 1, 4 and 5. One of ordinary skill will realize that other embodiments implement this tool in a different manner than the manner illustrated in these three figures. The adjustment of this tool causes the application to perform the series of processes that were described above to adjust the color contrast of an image or video clip.

The menu bar 825 provides several grouped sets of menu commands and options for the media editing application. One such option is tools tab 830 which when selected displays a list of selectable tools that includes a voice-over tool menu item 835. In some embodiments, the shortcut menu bar 820 displays several icons that represent selectable items in menu bar 825. As such, the voice-over tool menu item 835 may be represented as a selectable icon in the shortcut menu bar 820. Alternatively or conjunctively, the voice-over tool menu item 835 may be represented in another display area of the GUI 800 (e.g., in the toolbar 850).

In some embodiments, the browser window 855 includes a list of video clips along with metadata (e.g., timecode information) about the video clips. In some embodiments, the list of video clips is the list of video clips in a particular sequence of video clips, and the metadata specifies in and out points, durations, etc. for the video clips. In the example illustrated in FIG. 8, the browser window is displayed as a child window of the GUI 800; however, the browser window may alternatively be displayed in a window that is separate from the GUI 800. When the browser window is displayed separately, the browser window and GUI may conjunctively perform various operations (e.g., modifications to items in the browser window may affect the display of the GUI 800, the data included in a composite project that is active in the GUI 800, etc.).

As shown in FIG. 8, a selection of the "tools" tab 830 in the menu 825 with a cursor 890 causes the GUI 800 to displays a list of tools. The list of tool includes voice-over tool menu item 835 for opening the voice-over tool. The cursor 890 is placed over the voice-over tool menu item 835 in order to open the voice-over tool.

VII. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 9:
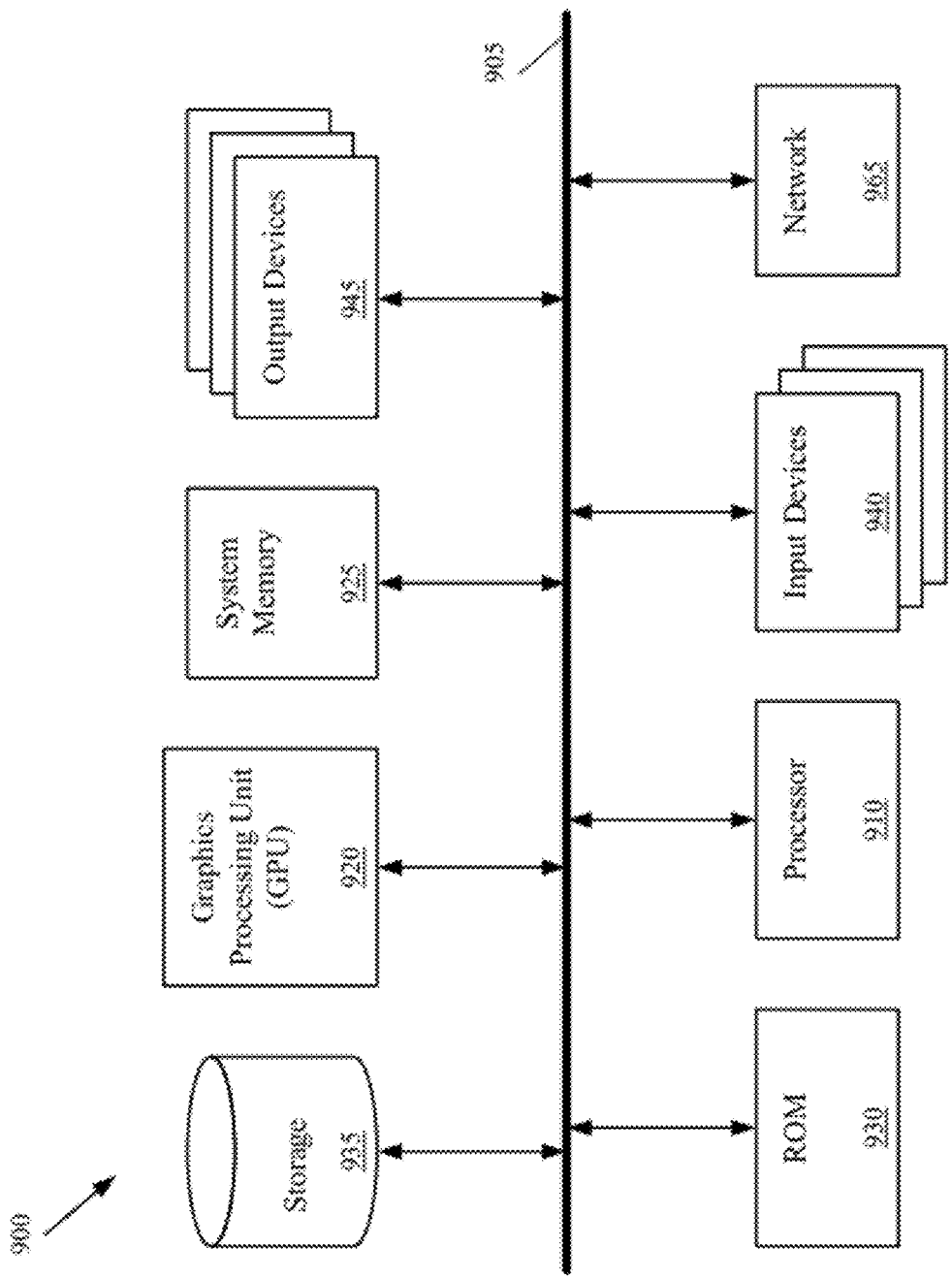
FIG. 9 conceptually illustrates a computer system with which some embodiments of the invention are implemented.

FIG. 9 illustrates a computing device (e.g., a desktop computer, a laptop or tablet computer, a mobile device, a smartphone, a settop box, etc.) with which some embodiments of the invention are implemented. Such a device includes various types of computer readable media and interfaces for various other types of computer readable media. Computing device 900 includes a bus 905, a processor 910, a graphics processing unit (GPU) 920, a system memory 925, a read-only memory 930, a permanent storage device 935, input devices 940, and output devices 945.

The bus 905 collectively represents all system, peripheral, and chipset buses that communicatively connect the numerous internal devices of the device 900. For instance, the bus 905 communicatively connects the processor 910 with the read-only memory 930, the GPU 920, the system memory 925, and the permanent storage device 935.

From these various memory units, the processor 910 downloads instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 920. The GPU 920 can offload various computations or complement the image processing provided by the processor 910.

The read-only-memory (ROM) 930 stores static data and instructions that are needed by the processor 910 and other modules of the device. The permanent storage device 935, on the other hand, is a read-and-write memory device. This device is a non-volatile memory unit that stores instructions and data even when the device 900 is off. Some embodiments of the invention use a mass-storage device (such as a magnetic or optical disk and its corresponding disk drive) as the permanent storage device 935.

Other embodiments use a removable storage device (such as a floppy disk, flash drive, or ZIP® disk, and its corresponding disk drive) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. For example, the various memory units include instructions for processing multimedia items in accordance with some embodiments. From these various memory units, the processor 910 downloads instructions to execute and data to process in order to execute the processes of some embodiments.

The bus 905 also connects to the input and output devices 940 and 945. The input devices enable the user to communicate information and select commands to the device. The input devices 940 include alphanumeric keyboards and pointing devices (also called "cursor control devices"). The output devices 945 display images generated by the device. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the internet. Any or all components of device 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD–RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people, groups of people, and functions (e.g., remembering) of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, several figures conceptually illustrate processes. The specific operations of the processes might not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A method of enhancing color values of an image comprising a plurality of pixels, wherein each pixel comprises an achromatic color component value and a chromatic color component value, the method comprising:
   applying a continuous, monotonically increasing, non-linear function to each pixel's achromatic color component value; and
   for each pixel, adjusting the pixel's chromatic color component value based on a relative change of the pixel's achromatic color component value that resulted from the application of the function.

2. The method of claim 1, wherein the function is a sigmoidal function.

3. The method of claim 1, wherein said achromatic color component value is a brightness value.

4. The method of claim 1, wherein said achromatic color component value is a luminance value.

5. The method of claim 1, wherein adjusting the pixel's chromatic color component value comprises multiplying the chromatic value by a factor that depends on the adjustment to the pixel's achromatic color component value.

6. The method of claim 1 further comprising receiving a contrast adjustment value, wherein said function depends on said contrast adjustment value.

7. The method of claim 6, wherein the non-linear function is a sigmoidal function with a slope that is at least partly based on said contrast adjustment value.

8. The method of claim 7, wherein a central portion of the sigmoidal function is steeper for larger contrast adjustment values than for smaller contrast adjustment values.

9. A computer readable medium storing a media editing computer program which when executed on at least one processor adjusts achromatic and chromatic values of an image, the computer program comprising sets of instructions for:
   applying a continuous, monotonically increasing, non-linear function to each pixel's achromatic color component value; and
   for each pixel, adjusting the pixel's chromatic color component value based on a relative change of the pixel's achromatic color component value that resulted from the application of the function.

10. The computer readable medium of claim 9, wherein the computer program further comprises a set of instructions for:
    providing a graphical user interface (GUI) control for receiving a contrast adjustment value; and
    adjusting said function based on said contrast adjustment value.

11. The computer readable medium of claim 10, wherein the function is a sigmoidal function with a slope that is at least partly based on said contrast adjustment value.

12. The computer readable medium of claim 11, wherein a central portion of the sigmoidal function is steeper for larger contrast adjustment values than for smaller contrast adjustment values.

13. The computer readable medium of claim 11, wherein the set of instructions for adjusting said function comprises a set of instructions for rescaling the function in relation to said contrast adjustment.

14. The computer readable medium of claim 9, wherein the function is a sigmoidal function.

15. The computer readable medium of claim 9, wherein said achromatic color component value is a brightness value.

16. The computer readable medium of claim 9, wherein said achromatic color component value is a luminance value.

17. The computer readable medium of claim 9, wherein the set of instructions for adjusting the pixel's chromatic color component value comprises a set of instructions for multiplying the chromatic value by a factor that depends on the adjustment to the pixel's achromatic color component value.

18. A system comprising a processor, a memory, and an electronic display device that displays a graphical user interface (GUI) for enhancing color values of an image comprising a plurality of pixels, wherein each pixel comprises an achromatic color component value and a chromatic color component value, the GUI comprising:
    a display area for displaying said image;
    a control for receiving a command to enhance said color values, wherein upon receiving said command, said computer system uses the processor to (i) adjust a non-linear function for converting a set of original achromatic color component values into a set of adjusted achromatic color component values; (ii) apply said adjusted non-linear function to the pixels; (iii) adjust the pixel's chromatic color component value based on a relative change of the pixel's achromatic color component value that resulted from the application of the function.

19. The system of claim 18, wherein the non-linear function is a sigmoidal function with a slope that is at least partly based on said contrast adjustment value.

20. The system of claim 19, wherein a central portion of the sigmoidal function is steeper for larger contrast adjustment values than for smaller contrast adjustment values.

21. The system of claim 19, wherein said image is stored in said memory of the computer system in a color coordinate system that the achromatic color component value and two chromatic color component values.

* * * * *